(12) United States Patent
Yamazaki et al.

(10) Patent No.: US 9,787,126 B2
(45) Date of Patent: Oct. 10, 2017

(54) DRIVING METHOD OF ELECTROCHEMICAL DEVICE

(71) Applicant: SEMICONDUCTOR ENERGY LABORATORY CO., LTD., Atsugi-shi, Kanagawa-ken (JP)

(72) Inventors: Shunpei Yamazaki, Tokyo (JP); Teppei Oguni, Kanagawa (JP)

(73) Assignee: Semiconductor Energy Laboratory Co., LTD., Kanagawa-ken (JP)

( * ) Notice: Subject to any disclaimer, the term of this patent is extended or adjusted under 35 U.S.C. 154(b) by 239 days.

(21) Appl. No.: 14/173,029

(22) Filed: Feb. 5, 2014

(65) Prior Publication Data

US 2014/0225569 A1    Aug. 14, 2014

(30) Foreign Application Priority Data

Feb. 8, 2013   (JP) .................. 2013-023866

(51) Int. Cl.
  *H02J 7/00*   (2006.01)
(52) U.S. Cl.
  CPC ........... *H02J 7/0093* (2013.01); *H02J 7/0075* (2013.01)
(58) Field of Classification Search
  USPC ....................... 320/134, 152, 128
  See application file for complete search history.

(56) References Cited

U.S. PATENT DOCUMENTS

| | | | |
|---|---|---|---|
| 3,640,770 A | 2/1972 | Zito | |
| 4,525,437 A | 6/1985 | Yamazaki | |
| 4,857,419 A | 8/1989 | Jinnai et al. | |
| 6,204,545 B1 | 3/2001 | Nakata | |
| 6,366,056 B1 | 4/2002 | Podrazhansky et al. | |
| 7,128,825 B2 | 10/2006 | Liu et al. | |
| 8,988,047 B2 | 3/2015 | Bartling et al. | |
| 2004/0099915 A1 | 5/2004 | Takayama et al. | |
| 2010/0188048 A1 | 7/2010 | Nishino et al. | |
| 2011/0031932 A1* | 2/2011 | Platonov | H01M 10/44 320/134 |
| 2011/0294009 A1 | 12/2011 | Kawakami et al. | |
| 2012/0148901 A1* | 6/2012 | Okamoto | H01M 2/145 429/145 |
| 2012/0244430 A1 | 9/2012 | Yamazaki et al. | |
| 2012/0319655 A1* | 12/2012 | Ravet | C01B 25/45 320/128 |

(Continued)

FOREIGN PATENT DOCUMENTS

| | | |
|---|---|---|
| JP | 05-152002 | 6/1993 |
| JP | H05-152002 | 6/1993 |

(Continued)

*Primary Examiner* — Brian Ngo
(74) *Attorney, Agent, or Firm* — Nixon Peabody LLP; Jeffrey L. Costellia

(57) ABSTRACT

When a hole in a separator is clogged, the cycle characteristics of a battery might be lowered and the internal resistance of a battery might be increased to reduce the output. Thus, a means for suppression of or recovery from degradation due to a clogged separator in a battery such as a lithium-ion secondary battery is provided. When reverse pulse current is supplied multiple times during charge, a separator is prevented from being clogged and a voltage increase (increase in internal resistance) during charge is suppressed, so that charge can be normally performed repeatedly.

14 Claims, 14 Drawing Sheets

(56) References Cited

U.S. PATENT DOCUMENTS

2014/0197797 A1 7/2014 Yamazaki
2014/0197802 A1 7/2014 Yamazaki
2014/0199580 A1 7/2014 Yamazaki

FOREIGN PATENT DOCUMENTS

| JP | 2009-032668 | 2/2009 |
| JP | 2009-181907 | 8/2009 |
| JP | 2011-216200 | 10/2011 |
| JP | 2012-009418 | 1/2012 |
| WO | WO2009/001502 | 12/2008 |

* cited by examiner

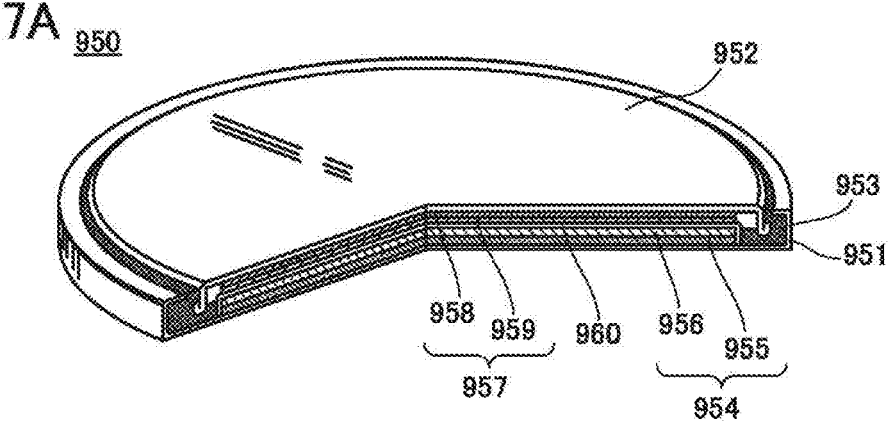
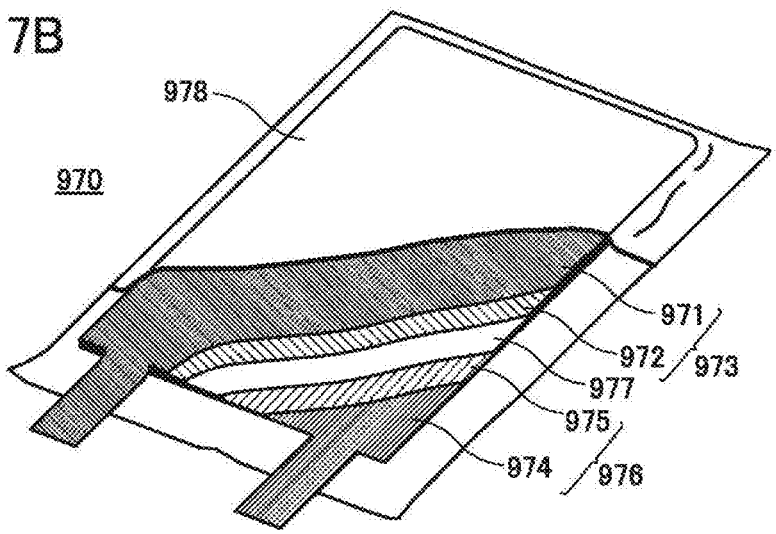
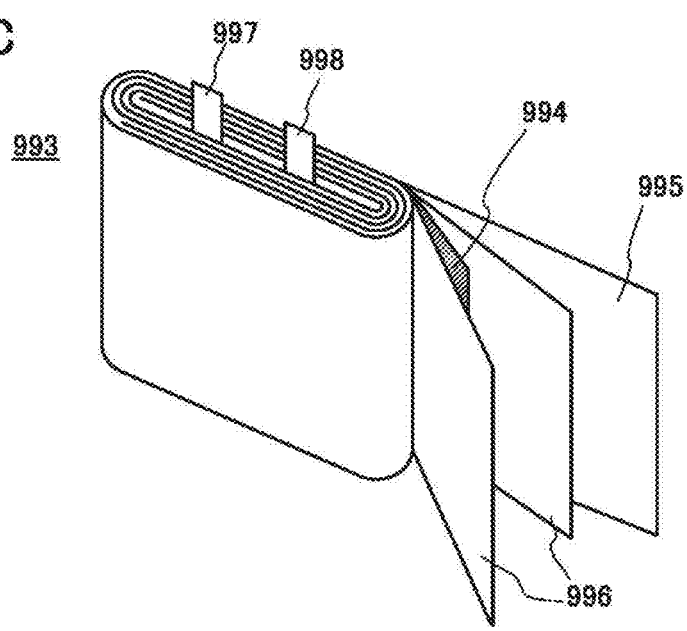

DRIVING METHOD OF ELECTROCHEMICAL DEVICE

BACKGROUND OF THE INVENTION

1. Field of the Invention

The present invention relates to an object, a method, or a manufacturing method. In addition, the present invention relates to a process, a machine, manufacture, or a composition of matter. In particular, the present invention relates to, for example, a power storage device, a secondary battery, a driving method thereof, or a fabrication method thereof. In particular, the present invention relates to, for example, an electrochemical device and a driving method of an electrochemical device. In addition, the present invention relates to, for example, a system having a function of reducing the degree of degradation of an electrochemical device.

Note that an electrochemical device in this specification generally means a device that utilizes an electrochemical phenomenon, specifically, a battery or the like.

2. Description of the Related Art

A lithium-ion secondary battery, which is one of electrochemical devices, is used in a variety of applications including a power source of a mobile phone, a fixed power source of a residential power storage system, power storage equipment of a power generation facility, such as a solar cell, and the like. Characteristics such as high energy density, excellent cycle characteristics, safety under various operating environments, and long-term reliability are necessary for the lithium-ion secondary battery.

In addition, the lithium-ion secondary battery includes at least a positive electrode, a negative electrode, and an electrolytic solution (Patent Document 1).

REFERENCE

Patent Document

[Patent Document 1] Japanese Published Patent Application No. 2012-009418

SUMMARY OF THE INVENTION

The battery such as the lithium-ion secondary battery is degraded due to repeated charge and discharge and the capacity of the battery is gradually decreased.

When a battery that deteriorated because of the capacity decrease was analyzed, it was found that a separator provided between a pair of electrodes (a positive electrode and a negative electrode) was altered and clogged. A separator serves as a partition to prevent a short circuit between a pair of electrodes. Further, a separator is formed using a material that is stable in an electrolyte solution. Furthermore, a separator has a plurality of minute holes serving as paths through which lithium ions move between a pair of electrodes during charge and discharge.

When a hole in a separator is clogged, the cycle characteristics of a battery might be lowered. Further, when a separator is clogged, the internal resistance of a battery might be increased to reduce the output.

An object is to provide a means for suppression of or recovery from degradation due to a clogged separator in a battery such as a lithium-ion secondary battery. Another object is to provide a means for reducing clogging of a separator in a battery such as a lithium-ion secondary battery. Another object is to provide a means for suppressing an increase in internal resistance in a battery such as a lithium-ion secondary battery. Another object is to provide a means for suppressing a reduction in output in a battery such as a lithium-ion secondary battery.

Further, when a deteriorated battery was analyzed, it was found that lithium aggregated to be whiskers on a surface of graphite, which is a negative electrode. The lithium whiskers might cause a short circuit between a pair of electrodes.

In the case where the lithium whiskers are partly separated, the separated lithium might be attached to a separator to cause clogging. Further, the amount of lithium is reduced by the amount of the separated lithium, which might results in a decrease in the capacity of a battery. In view of the above, an object is to provide a means for suppression of or recovery from aggregation of metals on a negative electrode surface of a battery such as a lithium-ion secondary battery. Another object is to provide a means for preventing a lithium whisker from being separated in a battery such as a lithium-ion secondary battery. Another object is to provide a means for suppression of or recovery from a short circuit between electrodes of a battery such as a lithium-ion secondary battery. Another object is to provide a means for suppression of or recovery from a decrease in capacity of a battery such as a lithium-ion secondary battery. Another object of the present invention is to provide a novel driving method, a novel charging method, or a novel discharging method of a battery such as a lithium-ion secondary battery. Note that the descriptions of these objects do not disturb the existence of other objects. Note that in one embodiment of the present invention, there is no need to achieve all the objects. Note that other objects will be apparent from and can be derived from the description of the specification, the drawings, the claims, and the like.

Reverse pulse current is supplied in a degraded battery for a short time during charge to perform temporary discharge multiple times, in other words, to apply a reverse pulse group, whereby a lithium whisker is dissolved. When reverse pulse current is supplied multiple times, a lithium ion battery can recover from long-term degradation caused by repeated charge, and ideally, a lithium ion battery having substantially no lithium deposit on an electrode surface after the charge is fabricated. This means that one embodiment of the present invention can provide a means for recovery from a reduction in capacity of a battery without making a battery structure complicated. In addition, lithium deposition is suppressed; thus, accidents such as fire due to a short circuit between a pair of electrodes can be prevented.

Note that reverse pulse current flows in a direction opposite to a direction of current (i.e., charge current during charge). The charge current flows, when a battery is charged, from a charger to a positive electrode, from the positive electrode to a negative electrode in the battery, and from the negative electrode to the charger. This means that reverse pulse current flows from a negative electrode to a positive electrode in a battery, flows from the positive electrode to the negative electrode outside the battery, and flows in the same direction as discharge current during discharge. Here, for example, a period (a period t1) during which n-th reverse pulse current (note that n is a natural number greater than or equal to 2) flows to an electrode is shorter than a period (a period t2) during which charge current flows after the previous reverse pulse current ((n−1)-th reverse pulse current) is supplied, and is preferably sufficiently short. The expression "pulse" of the "reverse pulse current" covers not only momentary the flow of a current in the reverse direction of a charging current when a battery is charged but also the temporary flow of a current in the reverse direction of a charging current for a period of time that cannot be perceived as momentary by intuition (for example, for longer than or equal to 1 second). The period t1 during which reverse pulse current flows is longer than or equal to 1/100 of the period t2 during which charge current flows and shorter than or equal to 1/3 of the period t2. Specifically, the period t1 during which reverse pulse current flows can be longer than or equal to 0.1 seconds and shorter than or equal to 3 minutes, and longer than or equal to 3 seconds and shorter than or equal to 30 seconds as a typical example.

The reverse pulse current will be described with reference to FIGS. 1A and 1B.

In a lithium ion battery, an anode and a cathode change places during charge and discharge, and an oxidation reaction and a reduction reaction occur on the corresponding sides; hence, an electrode with a high redox potential is called a positive electrode 12 and an electrode with a low redox potential is called a negative electrode 14. For this reason, in this specification, the positive electrode 12 is referred to as a "positive electrode" and the negative electrode 14 is referred to as a "negative electrode" in all the cases where charge is performed, discharge is performed, a reverse pulse current is supplied, and a charging current is supplied. Note that a battery 10 in FIG. 1B includes the positive electrode 12, an electrolyte solution 13, the negative electrode 14, and a separator 15.

FIG. 1A shows change of current flowing in the battery during charge over time. Note that Ia represents charge current during charge. Although current Ia and reverse pulse current Iinv are constant current in FIG. 1A, the present invention is not limited thereto. For easy understanding, the direction of an arrow in FIG. 1B, which is the direction of current flowing from the positive electrode 12 to the negative electrode 14 outside the battery, is defined as the direction of current. Here, the current Ia and the reverse pulse current Iinv have positive values. For this reason, current flowing in a direction opposite to the defined direction is represented by −Ia, for example. Since the charge current flows in the direction opposite to the defined direction, the charge current is represented by −Ia in FIG. 1A. Meanwhile, since the direction of an arrow representing the charge current is opposite to the defined direction in FIG. 1B, the charge current is represented by Ia.

The number of times the reverse pulse current is supplied in one (full) charge is determined such that the separator is not clogged. The amount of the reverse pulse current and the timing of the reverse pulse current are also determined such that the separator is not clogged.

During one (full) charge, the reverse pulse current can be supplied multiple times with the period t1 during which the reverse pulse current flows varied.

The interval between the timings of the reverse pulse current and the interval between the timings of the charge current can be inconstant, and the period t2 during which the charge current is supplied during one (full) charge can vary. For example, the interval of the timings of the reverse pulse current can be shorter as the battery is close to full charge.

One embodiment of the invention disclosed in this specification is a driving method of an electrochemical device including the step of: after the electrochemical device including a battery is used and the capacity of the battery is reduced by 10% or more from an initial value, supplying reverse pulse current to the battery multiple times during charge to make the capacity reduction less than 5% of the initial capacity.

Note that the "initial value" refers to the capacity of a battery that is fully charged at the time of or after aging or the like when the battery is shipped.

Another embodiment of the invention is a driving method of an electrochemical device including the step of: after the electrochemical device including a battery is used and the capacity of the battery is reduced from an initial value because of rapid charge, supplying reverse pulse current to the battery multiple times during charge to make the capacity reduction less than 5% of the initial capacity.

In this specification, "rapid charge" refers to a charging rate greater than or equal to 1 C and less than 20 C. In this specification, when $LiFePO_4$ is used for the positive electrode of the battery and the theoretical capacity of the $LiFePO_4$ is 170 mAh/g, a charging current of 170 mA is 1 C (170 mA/g) assuming that the weight of the $LiFePO_4$ as the positive electrode is 1 g. In this case, an ideal battery is fully charged in an hour. Note that 1 C means the amount of current per unit weight for fully charging a battery (each evaluation cell, here) in an hour. Further, provided that 1 g of $LiFePO_4$ is a positive electrode, charging at a charging rate of 2 C means that charge is performed by supplying a charging current of 340 mA for 0.5 hours.

Lithium deposition and growth of a lithium whisker noticeably occur during rapid charge or during charge at low temperatures. Thus, reverse pulse current supplied multiple times during charge enables lithium deposits to be effectively dissolved particularly during rapid charge or during charge at low temperatures. As a result, when reverse pulse current is supplied multiple times, lithium deposits can be prevented from aggregating to be a lithium whisker and being partly separated to be attached to a separator, resulting in prevention of clogging.

Another embodiment of the invention is a driving method of an electrochemical device including the step of: after the electrochemical device including a battery is used and the capacity of the battery is reduced from an initial value because charge and discharge are repeated 300 or more times, supplying reverse pulse current to the battery multiple times during charge to make the capacity reduction less than 5% of the initial capacity.

In this specification, a "separator" refers to a film that is formed using an insulator such as a resin material, for example, polypropylene or polyethylene, having a number of minute holes or cellulose (paper) and provided between a pair of electrodes.

When reverse pulse current is supplied multiple times during charge, a separator is prevented from being clogged and a voltage increase (increase in internal resistance) during charge is suppressed, so that charge can be normally performed repeatedly. Further, supply of reverse pulse current during charge can suppress a reduction in capacity and reduce a risk of fire. Furthermore, a battery whose capacity is reduced from an initial value because of rapid charge can recover from degradation by reverse pulse current supplied multiple times during charge.

BRIEF DESCRIPTION OF THE DRAWINGS

FIGS. 7A to 7C illustrate batteries.

DETAILED DESCRIPTION OF THE INVENTION

Embodiments of the present invention will be described below in detail with reference to the drawings. Note that the present invention is not limited to the following description, and it is easily understood by those skilled in the art that modes and details disclosed herein can be modified in various ways. Further, the present invention is not construed as being limited to description of the embodiments.

Embodiment 1

First, description is made on the principle of operation of the lithium-ion secondary battery and the principle of lithium deposition with reference to FIGS. 2A and 2B, FIGS. 3A and 3B, and FIG. 4.

Figure 2A:
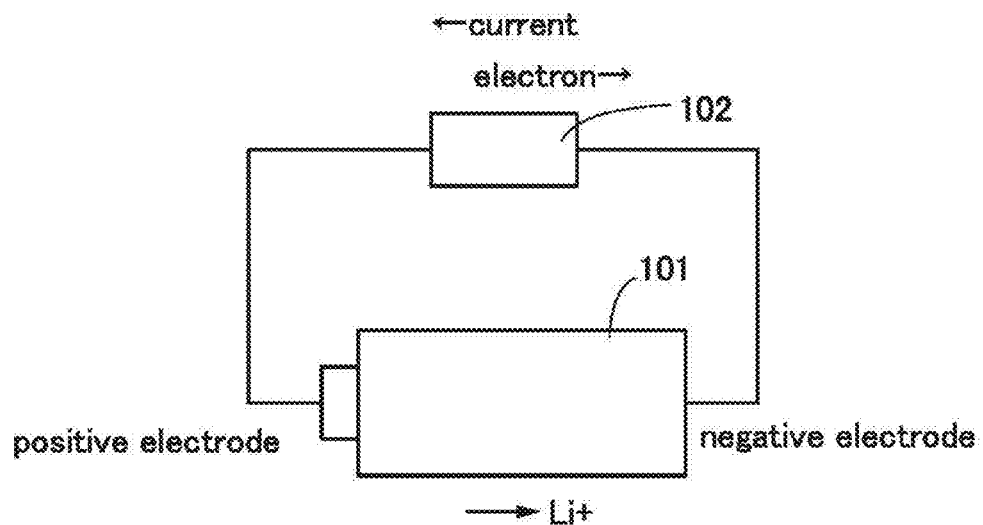
FIGS. 2A and 2B are conceptual diagrams illustrating a lithium-ion secondary battery being charged.
Figure 2B:
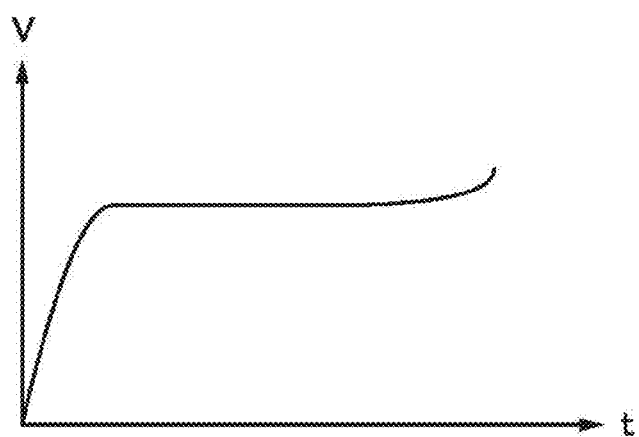
Figure 3A:
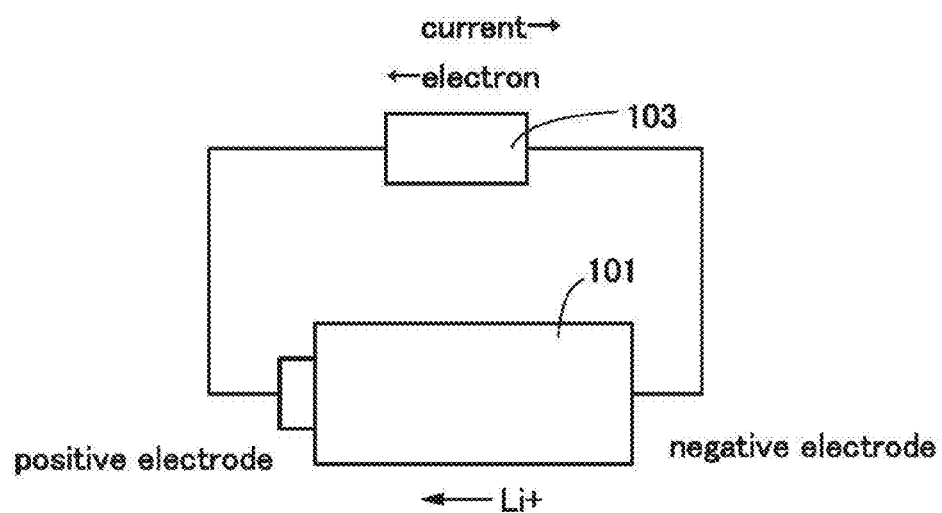
FIGS. 3A and 3B are conceptual diagrams illustrating a lithium-ion secondary battery being discharged.
Figure 3B:
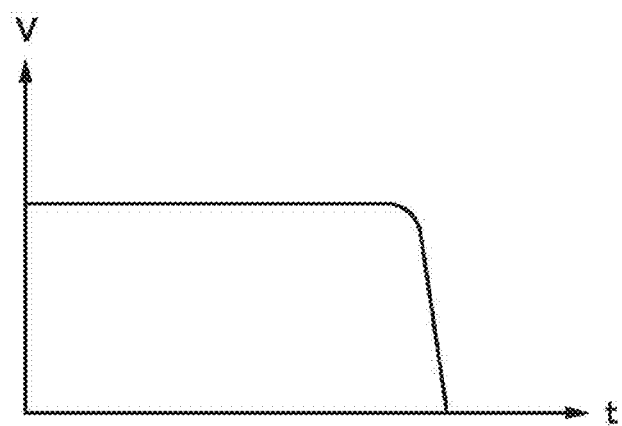

FIGS. 2A and 2B show the case of charging the lithium-ion secondary battery, and FIGS. 3A and 3B show the case of discharging the lithium-ion secondary battery. As illustrated in FIGS. 2A and 2B and FIGS. 3A and 3B, when a battery using lithium is regarded as a closed circuit, lithium ions move and a current flows in the same direction. Further, in the lithium-ion secondary battery, an anode and a cathode change places during charge and discharge, and an oxidation reaction and a reduction reaction occur on the corresponding sides; hence, an electrode with a high redox potential is called a positive electrode and an electrode with a low redox potential is called a negative electrode in this specification. For this reason, in this specification, the positive electrode is referred to as a "positive electrode" and the negative electrode is referred to as a "negative electrode" in all the cases where charge is performed, discharge is performed, a reverse pulse current is supplied, a discharging current is supplied, and a charging current is supplied. The use of the terms "anode" and "cathode" related to an oxidation reaction and a reduction reaction might cause confusion because the anode and the cathode change places at the time of charging and discharging. Thus, the terms "anode" and "cathode" are not used for description in this specification. If the terms "anode" or "cathode" is used, whether it is at the time of charging or discharging is noted and whether it corresponds to a positive electrode or a negative electrode is also noted. In FIGS. 2A and 2B and FIGS. 3A and 3B, a positive electrode includes lithium iron phosphate (LiFePO$_4$) as a positive electrode active material, and a negative electrode includes graphite as a negative electrode active material.

FIG. 2A illustrates a lithium-ion secondary battery 101 and a charger 102 in the case of charging the lithium-ion secondary battery. When the lithium-ion secondary battery is charged, a reaction expressed by Formula (1) occurs in the positive electrode.

$$\text{LiFePO}_4 \rightarrow \text{FePO}_4 + \text{Li}^+ + e^- \quad (1)$$

In addition, a reaction expressed by Formula (2) occurs in the negative electrode.

$$C_6 + \text{Li}^+ + e^- \rightarrow \text{LiC}_6 \quad (2)$$

Thus, the overall reaction in charging the lithium-ion secondary battery is expressed by Formula (3).

$$\text{LiFePO}_4 + C_6 \rightarrow \text{FePO}_4 + \text{LiC}_6 \quad (3)$$

When the battery is charged, in general, lithium is stored in graphite in the negative electrode; however, in the case where deposition of a lithium metal occurs at the negative electrode for any cause, a reaction expressed by Formula (4) occurs. That is, both a reaction of lithium insertion into graphite and a lithium deposition reaction occur at the negative electrode.

$$\text{Li}^+ + e^- \rightarrow \text{Li} \quad (4)$$

The equilibrium potentials of the positive electrode and the negative electrode are determined by a material and an equilibrium state of the material. The potential difference (voltage) between the electrodes varies depending on the equilibrium states of the materials of the positive electrode and the negative electrode.

FIG. 2B shows a voltage at the time of charging the lithium-ion secondary battery. As shown in FIG. 2B, in charging, as a reaction proceeds due to a current which flows over time t, the voltage between the electrodes increases.

FIG. 3A illustrates the lithium-ion secondary battery 101 and a load 103 in the case of discharging the lithium-ion secondary battery. When the lithium-ion secondary battery is discharged, a reaction expressed by Formula (5) occurs in the positive electrode.

$$\text{FePO}_4 + \text{Li}^+ + e^- \rightarrow \text{LiFePO}_4 \quad (5)$$

In addition, a reaction expressed by Formula (6) occurs in the negative electrode.

$$\text{LiC}_6 \rightarrow C_6 + \text{Li}^+ + e^- \quad (6)$$

Thus, the overall reaction in discharging the lithium-ion secondary battery is expressed by Formula (7).

$$\text{FePO}_4 + \text{LiC}_6 \rightarrow \text{LiFePO}_4 + C_6 \quad (7)$$

In addition, in discharge performed after the lithium metal is deposited, a reaction expressed by Formula (8) occurs in the negative electrode. That is, both a reaction of lithium extraction from graphite and a lithium dissolution reaction occur at the negative electrode.

$$\text{Li} \rightarrow \text{Li}^+ + e^- \quad (8)$$

FIG. 3B shows a voltage at the time of discharging the lithium-ion secondary battery. As shown in FIG. 3B, in discharging, as a reaction proceeds due to a current which flows over time t, the voltage between the electrodes decreases.

Figure 4:
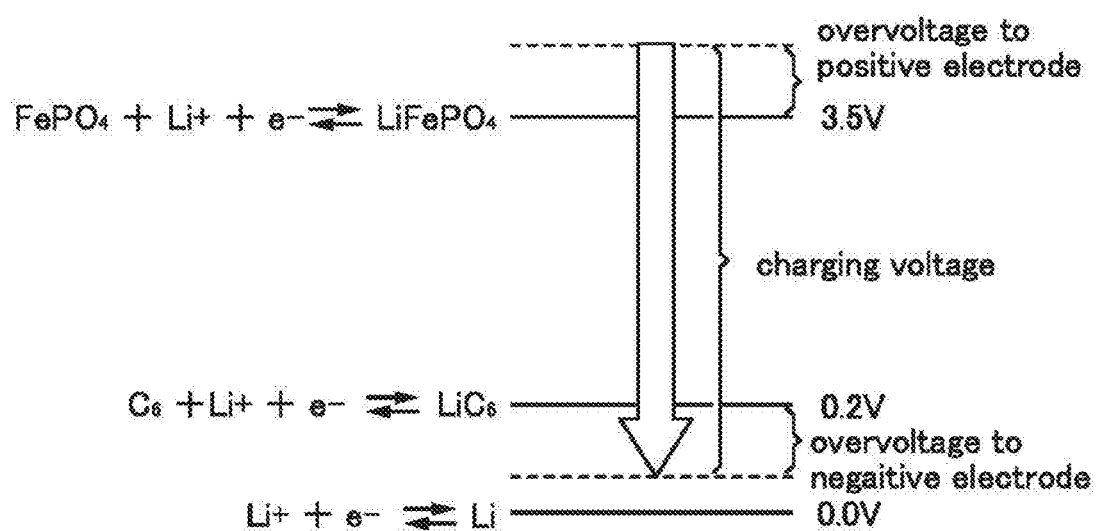
FIG. 4 illustrates the relation between the potentials of a positive electrode and a negative electrode.

FIG. 4 illustrates the relation between the electrode potential of a positive electrode including lithium iron phosphate and the electrode potential of a lithium metal electrode, and the relation between the electrode potential of a negative electrode including graphite and the electrode potential of the lithium metal electrode. In FIG. 4, the hollow arrow represents a charging voltage.

The electrode potential difference between the positive electrode including lithium iron phosphate and the negative electrode including graphite is as follows: 3.5 V−0.2 V=3.3 V. Since the electrode potentials are determined by the equilibrium states, at a charging voltage of 3.3 V, the reaction of Formula (1) and the reaction of Formula (5) equilibrate in the positive electrode and the reaction of Formula (2) and the reaction of Formula (6) equilibrate in the negative electrode; thus, a current does not flow.

For this reason, a charging voltage higher than 3.3 V is required to supply a charging current. For example, on the assumption that a series resistance component inside the battery is ignored and all extra charging voltage is used in the electrode reactions of Formulae (1) and (2), as indicated by the hollow arrow in FIG. 4, the extra charging voltage is shared by the positive electrode and the negative electrode as an overvoltage to the positive electrode and an overvoltage to the negative electrode. In order to obtain a higher current density per unit electrode area, a higher overvoltage is needed. For example, when quick charge is performed on the battery, a current density per unit surface area of an active material needs to be high, in which case a higher overvoltage is required.

However, as the overvoltage is raised to increase the current density per unit area of the active material, the overvoltage to the negative electrode increases; therefore, the tip of the hollow arrow in FIG. 4 becomes lower than the electrode potential of the lithium metal electrode. Then, the reaction of Formula (4) occurs. At this time, lithium is deposited on the surface of the negative electrode.

Figure 12:
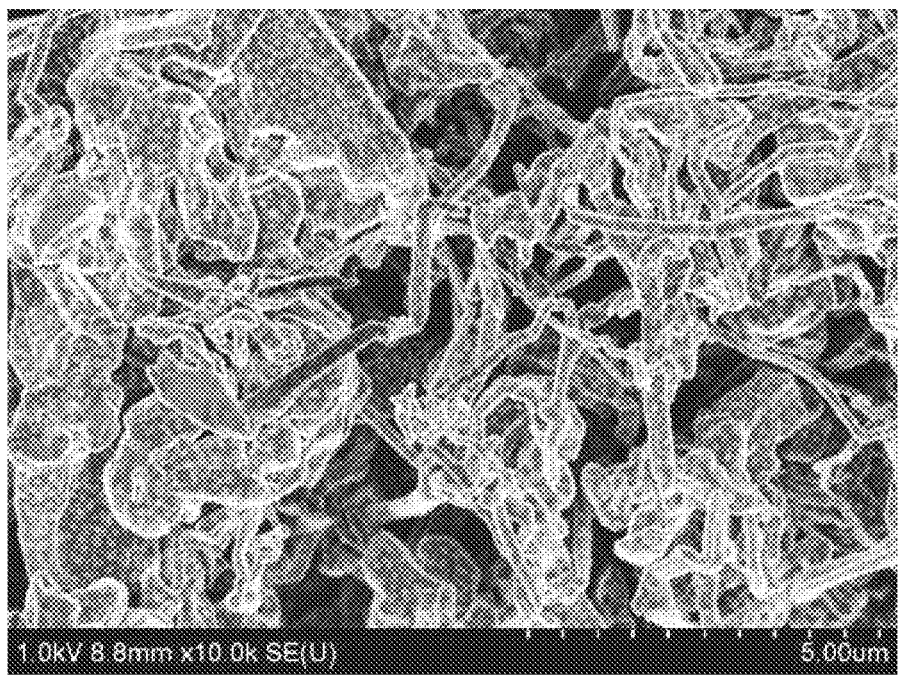
FIG. 12 is an image of lithium whiskers deposited on a surface of graphite.
Figure 13A:
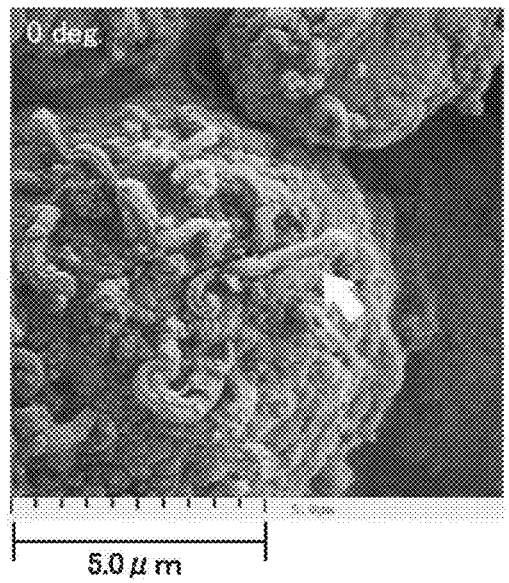
FIG. 13A is a plane image and FIG. 13B is a cross-sectional TEM image of lithium whiskers deposited on a surface of graphite.
Figure 13B:
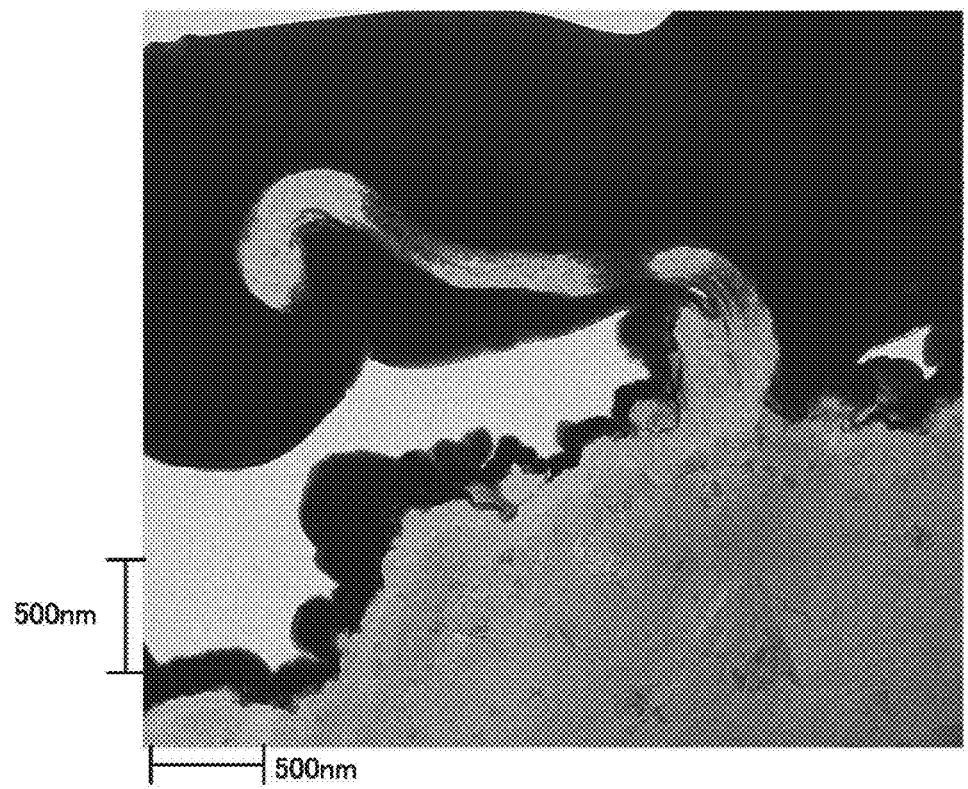

A charged coin-type lithium-ion secondary battery (a positive electrode is formed using $LiFePO_4$, a negative electrode is formed using graphite, and a separator is formed using polypropylene) was taken apart. FIG. 12 is a scanning electron microscope (SEM) image of lithium whiskers deposited on a surface of graphite. FIGS. 13A and 13B show observation results of some of whiskers of reaction products formed on a surface of a negative electrode active material in a different lithium-ion secondary battery that operated abnormally during charge. FIG. 13A is a plane image obtained by a scanning ion microscope (SIM). There is a whisker-like reaction product in a portion indicated by the white arrow in FIG. 13A. FIG. 13B is a cross-sectional image observed in the direction of the arrow in the SIM image. In the observation, a transmission electron microscope (TEM), H-9000NAR, manufactured by Hitachi High-Technologies Corporation was used at an acceleration voltage of 200 kV and a magnification of 55000 times.

As shown in FIG. 12 and FIGS. 13A and 13B, a lithium whisker grows while bending and thus is partly bent. The bent portion indicates that the lithium whisker grows from its tip and bottom.

Figure 14:
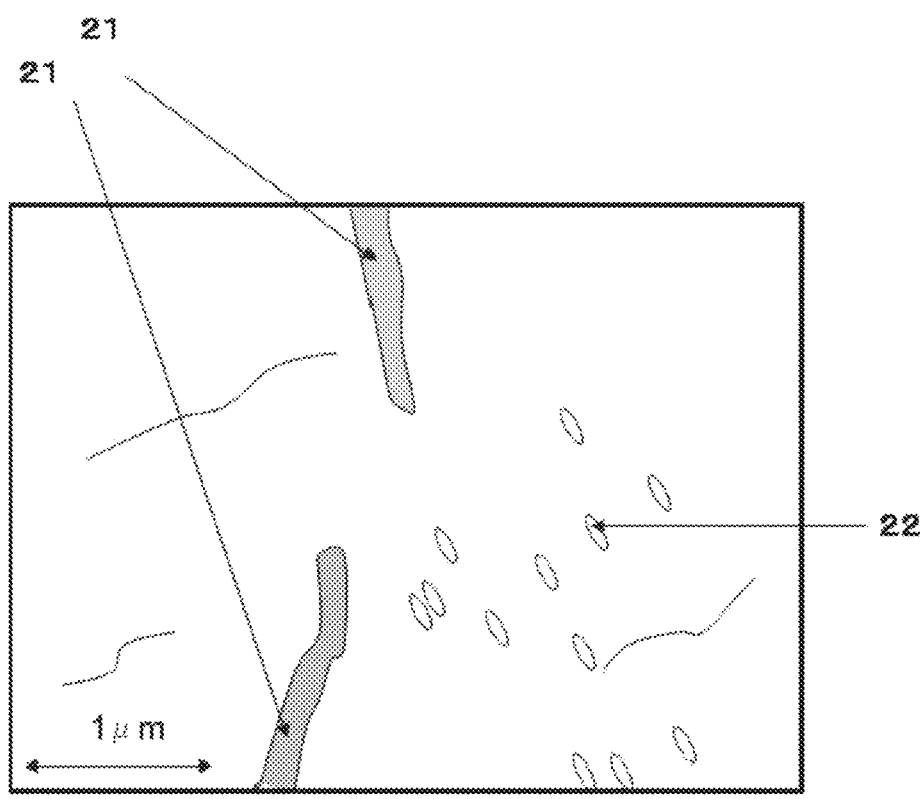
FIG. 14 is a schematic diagram of a separator to which lithium whiskers are attached.

Further, when the lithium-ion secondary battery that operated abnormally during charge was taken apart, lithium whiskers attached to a separator were observed. FIG. 14 is an observation schematic diagram of the separator.

There should be a number of minute holes 22 in the separator; however, some of them might disappear for some reasons. Further, as illustrated in FIG. 14, a lithium whisker 21 is attached in some cases. In such manners, the separator is clogged. Note that when a battery that operated abnormally during charge was taken apart, a separator was as shown in FIG. 14, which means that the clogging of the separator can be considered as one cause or one factor of a short circuit or a reduction in capacity.

In order that products such as the above lithium whisker 21, which cause the clogging of the separator, are not formed, reverse pulse current is supplied multiple times during charge.

Figure 1A:
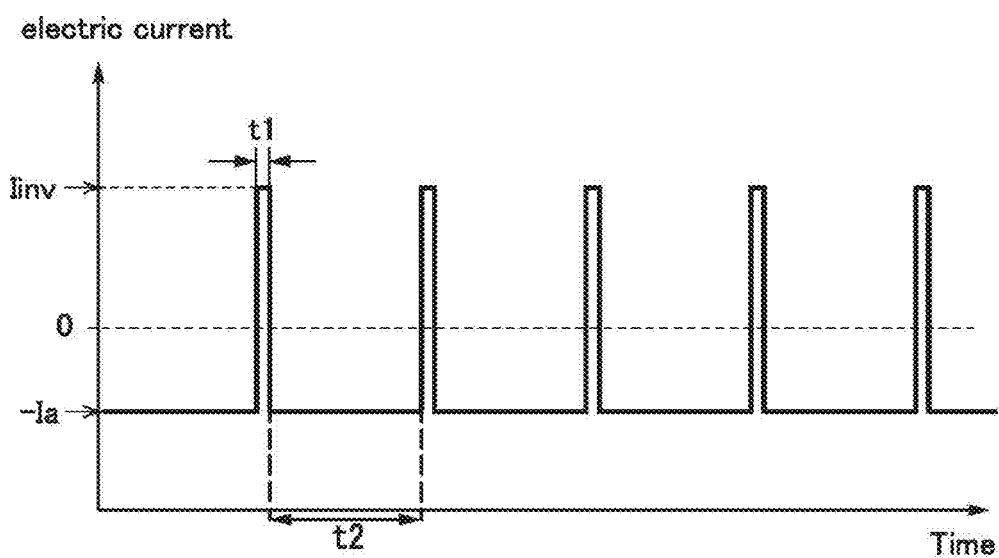
FIGS. 1A and 1B are schematic diagrams illustrating a method for supplying reverse pulse current during charge.

As illustrated in FIG. 1A, reverse pulse current is supplied multiple times during charge, in other words, the following operation is performed multiple times: charge is suspended and discharge current (i.e., reverse pulse current) is supplied. As a result, lithium deposition and clogging of the separator in the battery can be prevented. Note that there was a switching period from when the charge was stopped temporarily until when the supply of the reverse pulse current was started, in some cases. In the switching period, terminals of the battery were open-circuited, and a current hardly flowed in practice.

In FIG. 1A, as an example, the absolute value of the reverse pulse current Iinv is larger than the absolute value of the charge current Ia. Further, as an example, a period (the period t1) during which n-th reverse pulse current (note that n is a natural number greater than or equal to 2) is supplied is shorter than a period (the period t2) during which charge current flows after the previous reverse pulse current ((n−1)-th reverse pulse current) is supplied. The period t1 during which reverse pulse current is supplied is longer than or equal to 0.1 seconds and shorter than or equal to 3 minutes, and longer than or equal to 3 seconds and shorter than or equal to 30 seconds as a typical example.

Not only the period t1 during which reverse pulse current flows, but also the number of times reverse pulse current is supplied, the period t2 during which charge current flows, and the like are preferably adjusted as appropriate. It is preferable that reverse pulse current be supplied multiple times under optimal conditions, that is, conditions with which lithium deposition is effectively suppressed and the separator is not clogged, during charge in accordance with the battery characteristics. For example, the upper limit of the number of times reverse pulse current is supplied in one charging period is set so that the separator is not clogged.

Figure 1B:
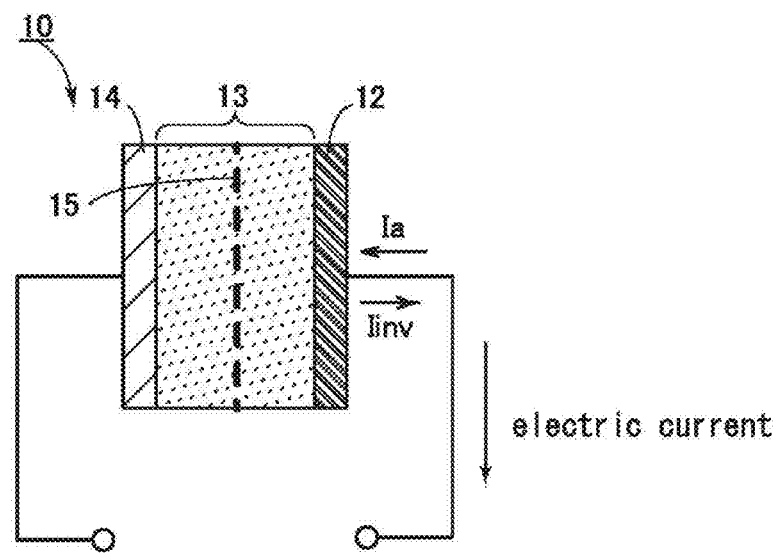

FIG. 1B is a cross-sectional view of the battery 10. The negative electrode 14 includes a negative electrode current collector and a negative electrode active material layer in contact with the negative electrode current collector. The negative electrode active material layer faces a positive electrode active material layer, and the electrolytic solution 13 and the separator 15 are provided between the positive electrode active material layer and the negative electrode active material layer.

The positive electrode 12 of the battery 10 includes a positive electrode current collector and the positive electrode active material layer in contact with the positive electrode current collector.

Figure 5A:
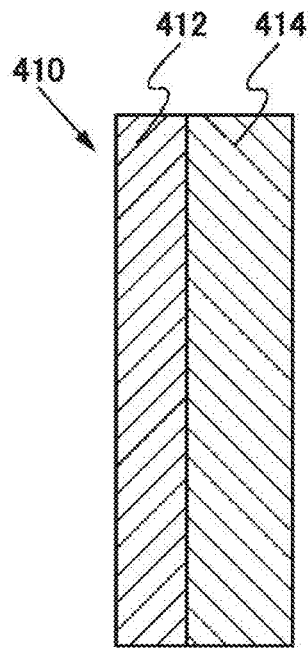
FIG. 5A is a longitudinal cross-sectional view of an electrode.

FIG. 5A is a longitudinal cross-sectional view of a storage battery electrode 410. In the storage battery electrode 410 in FIG. 5A, an active material layer 414 is provided over the current collector 412. The storage battery electrode 410 can be used as a positive electrode or a negative electrode. The active material layer 414 is formed over only one surface of the current collector 412 in FIG. 5A; however, the active material layers 414 may be formed so that the current collector 412 is sandwiched therebetween. The active material layer 414 does not necessarily need to be formed over the entire surface of the current collector 412 and a region that is not coated, such as a region for connection to an external terminal, is provided as appropriate.

<Current Collector>

The current collector 412 can be formed using a highly conductive material which is not alloyed with a carrier ion of lithium or the like, such as a metal typified by stainless steel, gold, platinum, zinc, iron, nickel, copper, aluminum, titanium, or tantalum or an alloy thereof. Alternatively, an aluminum alloy to which an element which increases heat resistance, such as silicon, titanium, neodymium, scandium, or molybdenum, is added can be used. Further alternatively, a metal element which forms silicide by reacting with silicon can be used. Examples of the metal element which forms silicide by reacting with silicon include zirconium, titanium, hafnium, vanadium, niobium, tantalum, chromium, molybdenum, tungsten, cobalt, nickel, and the like. The current collector 412 can have a foil-like shape, a plate-like shape (sheet-like shape), a net-like shape, a cylindrical shape, a coil shape, a punching-metal shape, an expanded-metal shape, or the like, as appropriate. The current collector 412 preferably has a thickness of greater than or equal to 10 μm and less than or equal to 30 μm.

<Active Material Layer>

The active material layer 414 includes at least an active material. The active material layer 414 may further include a binder for increasing adhesion of particles of the active material, a conductive additive for increasing the conductivity of the active material layer 414, and the like in addition to the active material.

<Positive Electrode Active Material>

In the case of using the storage battery electrode 410 as the positive electrode 12 of the battery 10, a material into and from which lithium ions can be inserted and extracted can be used for the active material (hereinafter referred to as a positive electrode active material) included in the active material layer 414. Examples of such a positive electrode active material are a lithium-containing material with an olivine crystal structure, a lithium-containing material with a layered rock-salt crystal structure, and a lithium-containing material with a spinel crystal structure. Specifically, a compound such as $LiFeO_2$, $LiCoO_2$, $LiNiO_2$, $LiMn_2O_4$, $V_2O_5$, $Cr_2O_5$, or $MnO_2$ can be used for the positive electrode active material.

Typical examples of the lithium-containing material with an olivine crystal structure (general formula: $LiMPO_4$ (M is one or more of Fe(II), Mn(II), Co(II), and Ni(II))) are $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ ($a+b \le 1$, $0<a<1$, and $0<b<1$), $LiFe_cNi_dCo_ePO_4$, $LiFe_cNi_dMn_ePO_4$, $LiNi_cCo_dMn_ePO_4$ ($c+d+e \le 1$, $0<c<1$, $0<d<1$, and $0<e<1$), and $LiFe_fNi_gCo_hMn_iPO_4$ ($f+g+h+i \le 1$, $0<f<1$, $0<g<1$, $0<h<1$, and $0<i<1$).

$LiFePO_4$ is particularly preferable because it properly has properties necessary for the positive electrode active material, such as safety, stability, high capacity density, high potential, and the existence of lithium ions which can be extracted in initial oxidation (charge). Note that the theoretical capacity of $LiFePO_4$ is 170 mAh/g.

Examples of the lithium-containing material with a layered rock-salt crystal structure are lithium cobalt oxide ($LiCoO_2$), $LiNiO_2$, $LiMnO_2$, $Li_2MnO_3$, NiCo-containing composite oxide (general formula: $LiNi_xCo_{1-x}O_2$ ($0<x<1$)) such as $LiNi_{0.8}Co_{0.2}O_2$, NiMn-containing composite oxide (general formula: $LiNi_xMn_{1-x}O_2$ ($0<x<1$)) such as $LiNi_{0.5}Mn_{0.5}O_2$, NiMnCo-containing composite oxide (also referred to as NMC) (general formula: $LiNi_xMn_yCo_{1-x-y}O_2$ ($x>0$, $y>0$, $x+y<1$)) such as $LiNi_{1/3}Mn_{1/3}Co_{1/3}O_2$, $Li(Ni_{0.8}Co_{0.15}Al_{0.05})O_2$, and $Li_2MnO_3$—$LiMO_2$ (M=Co, Ni, or Mn).

Examples of the lithium-containing material with a spinel crystal structure are $LiMn_2O_4$, $Li_{1+x}Mn_{2-x}O_4$, $Li(MnAl)_2O_4$, and $LiMn_{1.5}Ni_{0.5}O_4$.

It is preferable to add a small amount of lithium nickel oxide ($LiNiO_2$ or $LiNi_{1-x}MO_2$ (M=Co, Al, or the like)) to a lithium-containing material with a spinel crystal structure which contains manganese such as $LiMn_2O_4$ because advantages such as minimization of the elution of manganese and the decomposition of an electrolytic solution can be obtained.

Alternatively, a lithium-containing material such as $Li_{(2-j)}MSiO_4$ (general formula, and M is one or more of Fe(II), Mn(II), Co(II), and Ni(II), $0 \le j \le 2$) can be used for the positive electrode active material. Typical examples of $Li_{(2-j)}MSiO_4$ (general formula) are lithium compounds such as $Li_{(2-j)}FeSiO_4$, $Li_{(2-j)}NiSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$ ($k+l \le 1$, $0<k<1$, and $0<l<1$), $Li_{(2-j)}Fe_mNi_nCo_qSiO_4$, $Li_{(2-j)}Fe_mNi_nMn_qSiO_4$, $Li_{(2-j)}Ni_mCo_nMn_qSiO_4$ ($m+n+q \le 1$, $0<m<1$, $0<n<1$, and $0<q<1$), and $Li_{(2-j)}Fe_rNi_sCo_tMn_uSiO_4$ ($r+s+t+u \le 1$, $0<r<1$, $0<s<1$, $0<t<1$, and $0<u<1$).

Further alternatively, a nasicon compound expressed by a general formula $A_xM_2(XO_4)_3$ (A=Li, Na, or Mg, M=Fe, Mn, Ti, V, Nb, or Al, and X=S, P, Mo, W, As, or Si) can be used for the positive electrode active material. Examples of the nasicon compound are $Fe_2(MnO_4)_3$, $Fe_2(SO_4)_3$, and $Li_3Fe_2(PO_4)_3$. Still alternatively, a compound expressed by a general formula $Li_2MPO_4F$, $Li_2MP_2O_7$, or $Li_5MO_4$ (M=Fe or Mn), a perovskite fluoride such as $NaFeF_3$ or $FeF_3$, a metal chalcogenide (a sulfide, a selenide, or a telluride) such as $TiS_2$ or $MoS_2$, a lithium-containing material with an inverse spinel crystal structure such as $LiMVO_4$, a vanadium oxide ($V_2O_5$, $V_6O_{13}$, $LiV_3O_8$, or the like), a manganese oxide, an organic sulfur, or the like can be used as the positive electrode active material.

In the case where carrier ions are alkali metal ions other than lithium ions, or alkaline-earth metal ions, the following may be used as the positive electrode active material: a lithium compound or a lithium-containing material which is obtained by substituting an alkali metal (e.g., sodium or potassium) or an alkaline-earth metal (e.g., calcium, strontium, barium, beryllium, or magnesium) for lithium in the lithium compound or the lithium-containing material. Note that in the case where lithium ions are not used as carrier ions, although lithium deposition does not occur, a solid product of carrier ions other than the lithium ions might be generated, in which case supply of a reverse pulse current multiple times during charge so that the separator is not clogged is effective.

Alternatively, a material containing any of the above materials in combination can be used as the positive electrode active material. For example, a solid solution containing any of the above materials in combination, such as a solid solution of $LiCo_{1/3}Mn_{1/3}Ni_{1/3}O_2$ and $Li_2MnO_3$, can be used as the positive electrode active material.

<Negative Electrode Active Material>

When the storage battery electrode 410 is used as the negative electrode 14 of the battery 10, a material with which lithium can be dissolved and deposited or a material into and from which lithium ions can be inserted and extracted can be used for an active material (hereinafter referred to as a negative electrode active material) included in the active material layer 414; for example, a lithium metal, a carbon-based material, an alloy-based material, or the like can be used.

The lithium metal is preferable because of its low redox potential (3.045 V lower than that of a standard hydrogen electrode) and high specific capacity per unit weight and per unit volume (3860 mAh/g and 2062 $mAh/cm^3$).

Examples of the carbon-based material are graphite, graphitizing carbon (soft carbon), non-graphitizing carbon (hard carbon), a carbon nanotube, graphene, and carbon black.

Examples of the graphite are artificial graphite such as meso-carbon microbeads (MCMB), coke-based artificial graphite, and pitch-based artificial graphite and natural graphite such as spherical natural graphite.

Graphite has a low potential substantially equal to that of a lithium metal (0.1 V to 0.3 V vs. Li/Li$^+$) while lithium ions are intercalated into the graphite (while a lithium-graphite intercalation compound is formed). For this reason, a lithium-ion battery can have a high operating voltage. In addition, graphite is preferable because of its advantages such as relatively high capacity per unit volume, small volume expansion, low cost, and safety greater than that of a lithium metal.

For the negative electrode active material, an alloy-based material which enables charge-discharge reaction by an alloying reaction and a dealloying reaction with lithium can be used. In the case where carrier ions are lithium ions, for example, a material containing at least one of Al, Si, Ge, Sn, Pb, Sb, Bi, Ag, Au, Zn, Cd, In, Ga, and the like can be used. Such elements have higher capacity than carbon. For this reason, silicon is preferably used as the negative electrode active material. Examples of the alloy-based material using such elements include SiO, $Mg_2Si$, $Mg_2Ge$, SnO, $SnO_2$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, SbSn, and the like.

In particular, it is preferable to use silicon as the negative electrode active material because silicon has a significantly high theoretical capacity of 4200 mAh/g. In the case where silicon is used as the negative electrode active material, silicon has higher theoretical carrier ion reception capacity than graphite; thus, an increase in capacity of a lithium-ion secondary battery or a reduction in size of a lithium-ion secondary battery can be achieved.

Figure 5B:
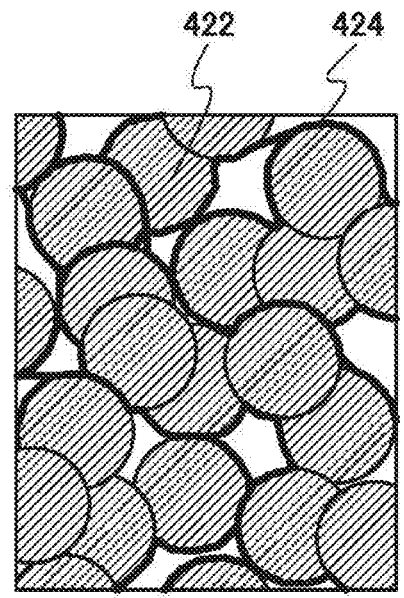
FIG. 5B is an enlarged longitudinal cross-sectional view of an active material layer.
Figure 5C:
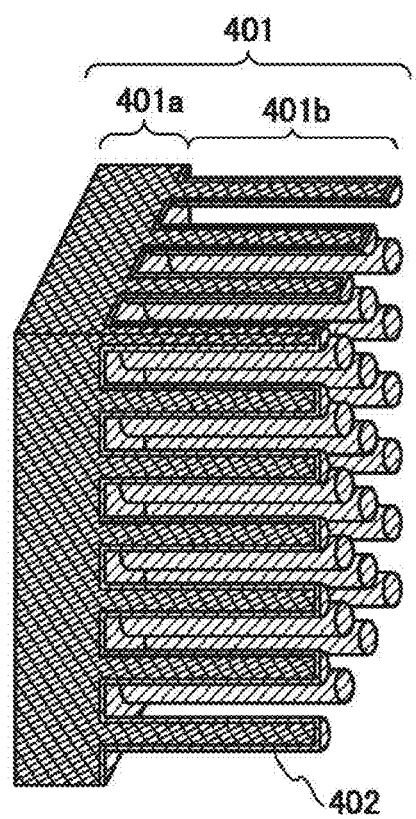
FIG. 5C is a cross-sectional view illustrating a variation of the electrode.

In the case of using silicon, it is preferable to employ an electrode structure illustrated in FIG. 5C because of its high volume expansion coefficient. FIG. 5C is a schematic cross-sectional view of an enlarged surface portion of a negative electrode. A negative electrode 401 has a structure like that of a spiky frog (kenzan) used in the Japanese art of flower arrangement. Although a base portion 401a which is thin is illustrated in the drawing, the base portion 401a is generally much thicker than protrusion portions 401b. The negative electrode 401 includes a plurality of protrusion portions 401b, the base portion 401a to which each of the plurality of protrusion portions is connected, and a negative electrode active material layer 402. In the case where silicon is used for the negative electrode active material layer 402, amorphous silicon, microcrystalline silicon, polycrystalline silicon, or a combination thereof can be used. In general, silicon with higher crystallinity has higher electric conductivity; thus, silicon with high crystallinity can be used for an electrode of a high-conductivity battery. Meanwhile, in the case of amorphous silicon, more carrier ions such as lithium ions can be occluded than in the case of crystalline silicon; thus, discharge capacity can be increased. Alternatively, silicon to which an impurity element imparting one conductivity type, such as phosphorus or boron, is added may be used for the negative electrode active material layer 402. Silicon to which the impurity element imparting one conductivity type, such as phosphorus or boron, is added has higher conductivity, so that the conductivity of the negative electrode can be increased.

The plurality of protrusion portions 401b extend in the direction substantially perpendicular to a surface of the base portion 401a. Here, the term "substantially" is used to mean a slight deviation from the direction perpendicular to a negative electrode current collector due to an error in leveling in a manufacturing process of the negative electrode current collector, step variation in a manufacturing process of the protrusion portions 401b, deformation on repeated charge and discharge, and the like is acceptable although the angle between the surface of the base portion 401a and a center axis of the protrusion portion 401b in the longitudinal direction is preferably 90°. Specifically, the angle between the surface of the base portion 401a and the center axis of the protrusion portion 401b in the longitudinal direction is 90° with a margin of error of ±10°, preferably 90° with a margin of error of ±5°. Note that the direction in which the plurality of protrusion portions 401b extend from the base portion 401a is referred to as the longitudinal direction. It is preferable to use titanium for the protrusion portions 401b and the base portion 401a. Titanium has higher strength than steel, and has a mass less than or equal to half of that of steel and thus is very light. Moreover, titanium has strength about twice as high as that of aluminum and is less likely to have metal fatigue than any other metals. Thus, titanium allows a light battery to be obtained and can function as a core of a negative electrode active material layer which has resistance to repeated stress; thus, deterioration or breakage due to expansion and contraction of silicon can be suppressed. Moreover, titanium is very suitable to be processed by dry etching and enables a protrusion portion with a high aspect ratio to be formed on a surface of a current collector.

For another negative electrode active material, an oxide such as titanium dioxide ($TiO_2$), lithium titanium oxide ($Li_4Ti_5O_{12}$), lithium-graphite intercalation compound ($Li_xC_6$), niobium pentoxide ($Nb_2O_5$), tungsten oxide ($WO_2$), or molybdenum oxide ($MoO_2$) can be used.

For another negative electrode active material, $Li_{3-x}M_xN$ (M=Co, Ni, or Cu) with a $Li_3N$ structure, which is a nitride containing lithium and a transition metal, can be used. For example, $Li_{2.6}Co_{0.4}N_3$ is preferable because of high charge and discharge capacity (900 mAh/g and 1890 mAh/cm$^3$).

A nitride containing lithium and a transition metal is preferably used, in which case lithium ions are contained in the negative electrode active material and thus the negative electrode active material can be used in combination with a material for a positive electrode active material which does not contain lithium ions, such as $V_2O_5$ or $Cr_3O_8$. Note that in the case of using a material containing lithium ions as a positive electrode active material, the nitride containing lithium and a transition metal can be used as the negative electrode active material by extracting the lithium ions contained in the positive electrode active material in advance.

Alternatively, a material which causes a conversion reaction can be used as the negative electrode active material; for example, a transition metal oxide which does not cause an alloy reaction with lithium, such as cobalt oxide (CoO), nickel oxide (NiO), or iron oxide (FeO), may be used. Other examples of the material which causes a conversion reaction include oxides such as $Fe_2O_3$, CuO, $Cu_2O$, $RuO_2$, and $Cr_2O_3$, sulfides such as $CoS_{0.89}$, NiS, or CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$. Note that any of the fluorides can be used as a positive electrode active material because of its high potential.

<Binder>

As the binder, polyvinylidene fluoride (PVDF) as a typical example, polyimide, polytetrafluoroethylene, polyvinyl chloride, ethylene-propylene-diene polymer, styrene-butadiene rubber, acrylonitrile-butadiene rubber, fluorine rubber, polyvinyl acetate, polymethyl methacrylate, polyethylene, nitrocellulose, or the like can be used.

<Conductive Additive>

As a conductive additive, a material that has a large specific surface area is preferably used; for example, acetylene black (AB) can be used. Alternatively, a carbon material such as a carbon nanotube, graphene, or fullerene can be used.

Graphene is flaky and has an excellent electrical characteristic of high conductivity and excellent physical properties of high flexibility and high mechanical strength. Thus, the use of graphene as the conductive additive can increase contact points and the contact area of particles of an active material.

Note that graphene in this specification refers to single-layer graphene or multilayer graphene including two or more and a hundred or less layers. Single-layer graphene refers to a one-atom-thick sheet of carbon molecules having $\pi$ bonds. Graphene oxide refers to a compound formed by oxidation of such graphene. When graphene oxide is reduced to form graphene, oxygen contained in the graphene oxide is not entirely released and part of the oxygen remains in the graphene. When the graphene contains oxygen, the proportion of the oxygen, which is measured by XPS, is higher than or equal to 2 atomic % and lower than or equal to 20 atomic %, preferably higher than or equal to 3 atomic % and lower than or equal to 15 atomic %.

In the case where graphene is multilayer graphene including graphene obtained by reducing graphene oxide, the interlayer distance between graphenes is greater than 0.34 nm and less than or equal to 0.5 nm, preferably greater than or equal to 0.38 nm and less than or equal to 0.42 nm, more preferably greater than or equal to 0.39 nm and less than or equal to 0.41 nm. In general graphite, the interlayer distance between single-layer graphenes is 0.34 nm. Since the interlayer distance between the graphenes obtained by reducing graphene oxides is longer than that in general graphite, carrier ions can easily transfer between the graphenes in multilayer graphene.

As the conductive additive, metal powder or metal fibers of copper, nickel, aluminum, silver, gold, or the like, a conductive ceramic material, or the like can be used instead of the above carbon material.

Here, an active material layer using graphene as the conductive additive is described with reference to FIG. 5B.

FIG. 5B is an enlarged longitudinal cross-sectional view of the active material layer 414. The active material layer 414 includes active material particles 422, graphenes 424 as a conductive additive, and a binder (not illustrated).

The longitudinal cross section of the active material layer 414 shows substantially uniform dispersion of the sheet-like graphenes 424 in the active material layer 414. The graphenes 424 are schematically shown by thick lines in FIG. 5B but are actually thin films each having a thickness corresponding to the thickness of a single layer or a multilayer of carbon molecules. The plurality of graphenes 424 are formed in such a way as to coat or be adhered to a plurality of the active material particles 422, so that the graphenes 424 make surface contact with the plurality of the active material particles 422. Further, the graphenes 424 are also in surface contact with each other; consequently, the plurality of graphenes 424 form a three-dimensional network for electronic conduction.

This is because graphene oxides with extremely high dispersibility in a polar solvent are used as materials of the graphenes 424. The solvent is removed by volatilization from a dispersion medium containing the graphene oxides uniformly dispersed and the graphene oxides are reduced to give graphenes; hence, the graphenes 424 remaining in the active material layer 414 partly overlap with each other and are dispersed such that surface contact is made, thereby forming a path for electronic conduction.

Unlike a conductive additive in the form of particles, such as acetylene black, which makes point contact with the active material, the graphenes 424 are capable of surface contact with low contact resistance; accordingly, the electronic conduction of the active material particles 422 and the graphenes 424 can be improved without an increase in the amount of a conductive additive. Thus, the proportion of the active material particles 422 in the active material layer 414 can be increased. Accordingly, the discharge capacity of the storage battery can be increased.

<Electrolytic Solution>

As an electrolyte in the electrolytic solution 13, a material which contains carrier ions is used. Typical examples of the electrolyte are lithium salts such as $LiPF_6$, $LiClO_4$, $Li(FSO_2)_2N$, $LiAsF_6$, $LiBF_4$, $LiCF_3SO_3$, $Li(CF_3SO_2)_2N$, and $Li(C_2F_5SO_2)_2N$. One of these electrolytes may be used alone or two or more of them may be used in an appropriate combination and in an appropriate ratio. For further stabilization, a small amount (1 wt %) of vinylene carbonate (VC) may be added to the electrolytic solution so that the decomposition amount of the electrolytic solution is further reduced.

Note that when carrier ions are alkali metal ions other than lithium ions, or alkaline-earth metal ions, instead of lithium in the above lithium salts, an alkali metal (e.g., sodium or potassium) or an alkaline-earth metal (e.g., calcium, strontium, barium, beryllium, or magnesium) may be used for the electrolyte.

As a solvent of the electrolytic solution, a material in which carrier ions can transfer is used. As the solvent of the electrolytic solution, an aprotic organic solvent is preferably used. Typical examples of the aprotic organic solvent include ethylene carbonate (EC), propylene carbonate, dimethyl carbonate, diethyl carbonate (DEC), γ-butyrolactone, acetonitrile, dimethoxyethane, tetrahydrofuran, and the like, and one or more of these materials can be used. When a gelled high-molecular material is used as the solvent of the electrolytic solution, safety against liquid leakage and the like is improved. Further, the storage battery can be thinner and more lightweight. Typical examples of gelled high-molecular materials include a silicone gel, an acrylic gel, an acrylonitrile gel, polyethylene oxide, polypropylene oxide, a fluorine-based polymer, and the like. Alternatively, the use of one or more of ionic liquids (room temperature molten salts) which have features of non-flammability and non-volatility as a solvent of the electrolytic solution can prevent the storage battery from exploding or catching fire even when the storage battery internally shorts out or the internal temperature increases owing to overcharge or the like. Further, the ionic liquid consists of a cation and an anion. Examples of such an ionic liquid are an ionic liquid containing an ethylmethylimidazolium (EMI) cation and an ionic liquid containing an N-methyl-N-propylpiperidinium ($PP_{13}$) cation.

<Separator>

As the separator 15, a porous film of cellulose (paper) or a polyolefin resin (e.g., polypropylene or polyethylene) with micropores can be used.

Although the case where lithium is deposited is described as an example in this embodiment, the present invention is not limited thereto. One embodiment of the present invention can be applied to any battery as long as the battery is degraded because of products attached to an electrode or a separator and the battery can recover from the degradation by reverse pulse current supplied multiple times during charge.

Embodiment 2

In this embodiment, an example where reverse pulse current is supplied multiple times during rapid charge is described with reference to FIG. 6.

Figure 6:
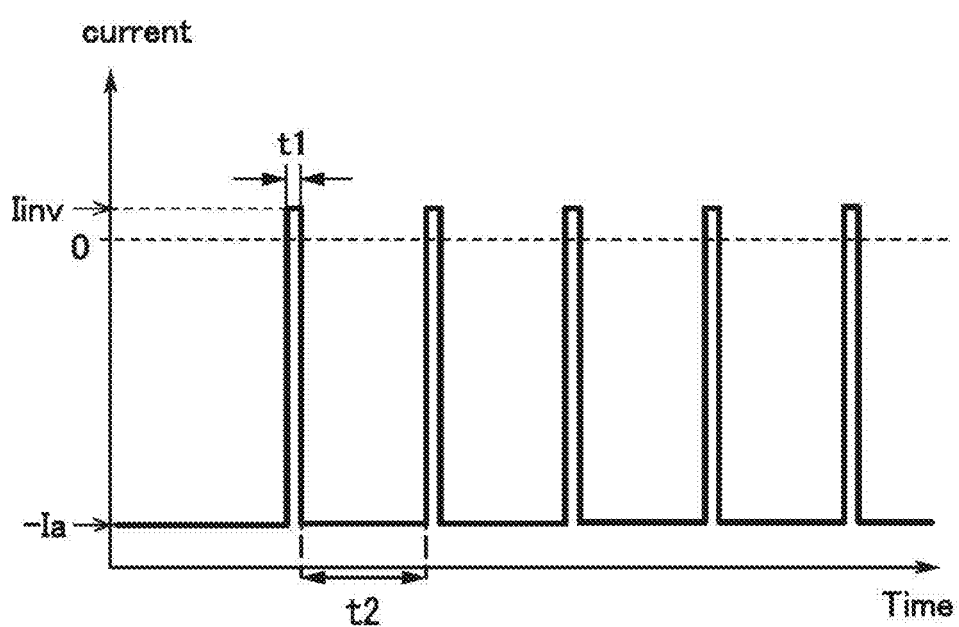
FIG. 6 is a schematic diagram illustrating an example of a method for supplying reverse pulse current during charge.

FIG. 1A shows an example where the absolute value of the reverse pulse current Iinv is larger than that of the current Ia, whereas FIG. 6 shows the case where the absolute value of the reverse pulse current Iinv is smaller than that of the current Ia. Since the current Ia is used for charge, the larger the absolute value of the current Ia is, the shorter the time required for full charge is.

Note that experiments suggest that the effect of one embodiment of the present invention cannot be obtained only when supply of charge current is stopped momentarily. To obtain the effect, reverse pulse current, which flows in a direction opposite to a direction of current causing lithium deposition, is supplied momentarily (i.e., for a period ranging from 0.1 seconds to 3 minutes, and from 3 seconds to 30 seconds as a typical example). Reverse pulse current is momentarily supplied multiple times during charge, whereby clogging of a separator can be prevented and a battery can recover from degradation.

Thus, when the reverse pulse current Iinv is set to greater than 0 mA, for example, to approximately 0.3 mA, and the current Ia is set to approximately 15 mA to supply current illustrated in FIG. 6 to a battery, the effect of one embodiment of the present invention can be obtained.

Further, not only the absolute value of the current Ia but also the absolute value of the reverse pulse current Iinv can be a large value as long as malfunction of the battery does not occur.

Although the example where the absolute values of the reverse pulse current Iinv and the current Ia are adjusted is described here, the period t1 during which reverse pulse current flows, the number of times reverse pulse current is supplied, the period t2 during which charge current flows, and the like are also preferably adjusted as appropriate. It is preferable that reverse pulse current be supplied under optimal conditions during charge in accordance with the battery characteristics, that is, conditions with which lithium deposition is effectively suppressed and the separator is not clogged. For example, the upper limit of the number of times reverse pulse current is supplied in one charge is set so that the separator is not clogged.

This embodiment can be freely combined with Embodiment 1.

Embodiment 3

The structures of lithium-ion secondary batteries will be described with reference to FIGS. 7A to 7C and FIGS. 8A and 8B.

FIG. 7A is an external view of a coin-type (single-layer flat type) lithium-ion secondary battery, part of which illustrates a cross-sectional view of the coin-type lithium-ion secondary battery.

In a coin-type secondary battery 950, a positive electrode can 951 serving also as a positive electrode terminal and a negative electrode can 952 serving also as a negative electrode terminal are insulated and sealed with a gasket 953 formed of polypropylene or the like. A positive electrode 954 includes a positive electrode current collector 955 and a positive electrode active material layer 956 which is provided to be in contact with the positive electrode current collector 955. A negative electrode 957 includes a negative electrode current collector 958 and a negative electrode active material layer 959 which is provided to be in contact with the negative electrode current collector 958. A separator 960 and an electrolytic solution (not illustrated) are included between the positive electrode active material layer 956 and the negative electrode active material layer 959.

The negative electrode 957 includes the negative electrode active material layer 959 over the negative electrode current collector 958. The positive electrode 954 includes the positive electrode active material layer 956 over the positive electrode current collector 955.

For the positive electrode 954, the negative electrode 957, the separator 960, and the electrolytic solution, the above-described members can be used.

For the positive electrode can 951 and the negative electrode can 952, a metal having corrosion resistance to an electrolytic solution, such as nickel, aluminum, or titanium, an alloy of such a metal, or an alloy of such a metal and another metal (e.g., stainless steel or the like) can be used. Alternatively, the positive electrode can 951 and the negative electrode can 952 are preferably covered with nickel, aluminum, or the like in order to prevent corrosion caused by the electrolyte solution. The positive electrode can 951 and the negative electrode can 952 are electrically connected to the positive electrode 954 and the negative electrode 957, respectively.

The negative electrode 957, the positive electrode 954, and the separator 960 are immersed in the electrolytic solution. Then, as illustrated in FIG. 7A, the positive electrode can 951, the positive electrode 954, the separator 960, the negative electrode 957, and the negative electrode can 952 are stacked in this order with the positive electrode can 951 positioned at the bottom, and the positive electrode can 951 and the negative electrode can 952 are subjected to pressure bonding with the gasket 953 interposed therebetween. In such a manner, the coin-type secondary battery 950 is fabricated.

Next, an example of a thin secondary battery including a layered film (also referred to as a laminated secondary battery) will be described with reference to FIG. 7B. In FIG. 7B, a structure inside the laminated secondary battery is partly exposed for convenience.

A laminated secondary battery 970 using a laminate film as an exterior body and illustrated in FIG. 7B includes a positive electrode 973 including a positive electrode current collector 971 and a positive electrode active material layer 972, a negative electrode 976 including a negative electrode current collector 974 and a negative electrode active material layer 975, a separator 977, an electrolytic solution (not illustrated), and an exterior body 978. The separator 977 is provided between the positive electrode 973 and the negative electrode 976 in the exterior body 978. The exterior body 978 is filled with the electrolytic solution. Although the one positive electrode 973, the one negative electrode 976, and the one separator 977 are used in FIG. 7B, the secondary battery may have a stacked-layer structure in which positive electrodes and negative electrodes are alternately stacked and separated by separators.

For the positive electrode, the negative electrode, the separator, and the electrolytic solution (an electrolyte and a solvent), the above-described members can be used.

In the laminated secondary battery 970 illustrated in FIG. 7B, the positive electrode current collector 971 and the negative electrode current collector 974 also serve as terminals (tabs) for an electrical contact with the outside. For this reason, each of the positive electrode current collector 971 and the negative electrode current collector 974 is arranged so that part of the positive electrode current collector 971 and part of the negative electrode current collector 974 are exposed outside the exterior body 978.

As the exterior body 978 in the laminated secondary battery 970, for example, a laminate film having the following three-layer structure can be used: a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide-based resin, a polyester-based resin, or the like is provided on the outer surface side of the exterior body and over the metal thin film. With such a three-layer structure, permeation of the electrolytic solution and a gas can be blocked and an insulating property can be obtained.

Figure 8A:
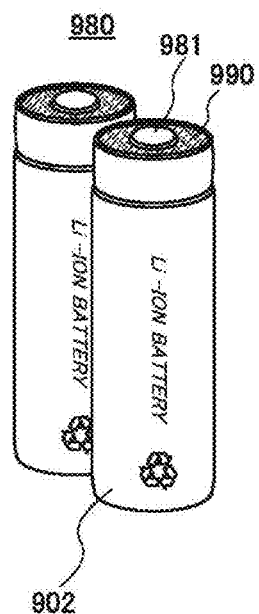
FIGS. 8A and 8B illustrate a battery.

Next, an example of a cylindrical secondary battery is described with reference to FIGS. 8A and 8B. As illustrated in FIG. 8A, a cylindrical secondary battery 980 includes a positive electrode cap (battery lid) 981 on the top surface and a battery can (outer can) 982 on the side surface and bottom surface. The positive electrode cap 981 and the battery can (outer can) 982 are insulated by the gasket 990 (insulating packing).

Figure 8B:
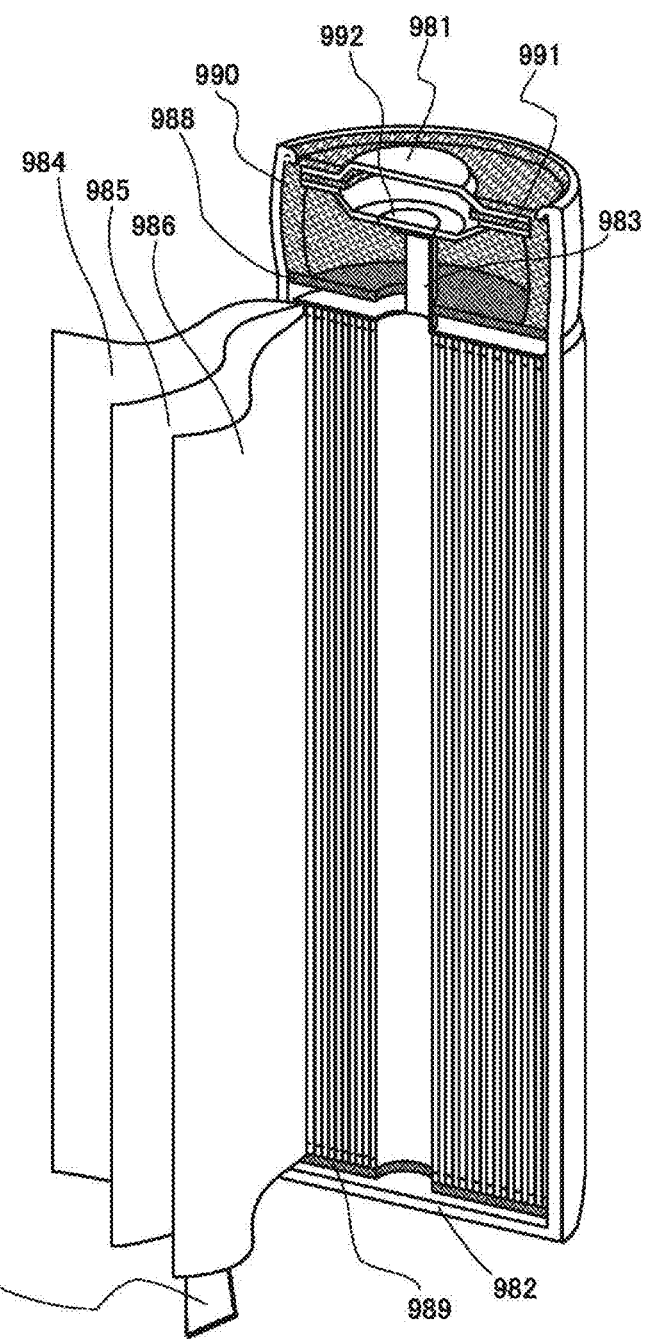

FIG. 8B is a schematic view of a cross-section of the cylindrical secondary battery. Inside the battery can 982 having a hollow cylindrical shape, a battery element in which a strip-like positive electrode 984 and a strip-like negative electrode 986 are wound with a stripe-like separator 985 provided therebetween is provided. Although not illustrated, the battery element is wound around a center pin. The battery can 982 is closed at one end and opened at the other end.

For the positive electrode 984, the negative electrode 986, and the separator 985, the above-described members can be used.

For the battery can 982, a metal having corrosion resistance to an electrolytic solution, such as nickel, aluminum, or titanium, an alloy of such a metal, or an alloy of such a metal and another metal (e.g., stainless steel or the like) can be used. Alternatively, the battery can 982 is preferably covered with nickel, aluminum, or the like in order to prevent corrosion caused by the electrolytic solution. Inside the battery can 982, the battery element in which the positive electrode, the negative electrode, and the separator are wound is provided between a pair of insulating plates 988 and 989 which face each other.

Further, an electrolytic solution (not illustrated) is injected inside the battery can 982 in which the battery element is provided. For the electrolytic solution, the above-described electrolyte and solvent can be used.

Since the positive electrode 984 and the negative electrode 986 of the cylindrical secondary battery are wound, active material layers are formed on both sides of the current collectors. A positive electrode terminal (positive electrode current collecting lead) 983 is connected to the positive electrode 984, and a negative electrode terminal (negative electrode current collecting lead) 987 is connected to the negative electrode 986. Both the positive electrode terminal 983 and the negative electrode terminal 987 can be formed using a metal material such as aluminum. The positive electrode terminal 983 and the negative electrode terminal 987 are resistance-welded to a safety valve mechanism 992 and the bottom of the battery can 982, respectively. The safety valve mechanism 992 is electrically connected to the positive electrode cap 981 through a positive temperature coefficient (PTC) element 991. The safety valve mechanism 992 cuts off electrical connection between the positive electrode cap 981 and the positive electrode 984 when the internal pressure of the battery increases and exceeds a predetermined threshold value. The PTC element 991 is a heat sensitive resistor whose resistance increases as temperature rises, and controls the amount of current by increase in resistance to prevent unusual heat generation. Barium titanate ($BaTiO_3$)-based semiconductor ceramic or the like can be used for the PTC element.

Next, an example of a rectangular secondary battery is described with reference to FIG. 7C. A wound body 993 illustrated in FIG. 7C includes a negative electrode 994, a positive electrode 995, and a separator 996. The wound body 993 is obtained by winding a sheet of a stack in which the negative electrode 994 overlaps with the positive electrode 995 with the separator 996 provided therebetween. The wound body 993 is covered with a rectangular sealed can or the like; thus, a rectangular secondary battery is fabricated. Note that the number of stacks each including the negative electrode 994, the positive electrode 995, and the separator 996 may be determined as appropriate depending on capacity and an element volume which are required.

As in the cylindrical secondary battery, in the rectangular secondary battery, the negative electrode 994 is connected to a negative electrode tab (not illustrated) through one of a terminal 997 and a terminal 998, and the positive electrode 995 is connected to a positive electrode tab (not illustrated) through the other of the terminal 997 and the terminal 998. Surrounding structures such as a safety valve mechanism are similar to those in the cylindrical secondary battery.

As described above, although the coin-type secondary battery, the laminated secondary battery, the cylindrical secondary battery, and the rectangular secondary battery are described as examples of the secondary battery, secondary batteries having a variety of shapes can be used. Further, a structure in which a plurality of positive electrodes, a plurality of negative electrodes, and a plurality of separators are stacked or wound may be employed.

Next, description is made on a lithium-ion capacitor, which is an example of batteries.

The lithium-ion capacitor is a hybrid capacitor which combines a positive electrode of an electric double layer capacitor (EDLC) and a negative electrode of a lithium-ion secondary battery using a carbon material, and also an asymmetric capacitor in which the principles of power storage are different between the positive electrode and the negative electrode. The positive electrode forms an electrical double layer and enables charge and discharge by a physical action, whereas the negative electrode enables charge and discharge by a chemical action of lithium. With the use of a negative electrode in which lithium is occluded in advance as the carbon material or the like that is a negative electrode active material, the lithium-ion capacitor can have energy density dramatically higher than that of a conventional electrical double layer capacitor including a negative electrode using active carbon.

In a lithium-ion capacitor, instead of a positive electrode active material layer in a lithium-ion secondary battery, a material that can reversibly adsorb at least one of lithium ions and anions is used. Examples of such a material are active carbon, a conductive high molecule, and a polyacenic semiconductor (PAS).

The lithium-ion capacitor has high efficiency of charge and discharge, capability of rapidly performing charge and discharge, and a long life even when it is repeatedly used.

For such a lithium-ion capacitor, the driving method of a battery, which is one embodiment of the present invention, can be used. Thus, generation of irreversible capacity can be reduced, so that a battery having increased cycle characteristics can be fabricated.

Next, a battery including an electric circuit and the like is described.

FIGS. 9A to 9D illustrate an example of a battery in which the above-described rectangular secondary battery is provided with an electric circuit and the like. In a battery 6600 illustrated in FIGS. 9A and 9B, a wound body 6601 is stored inside a battery can 6604. The wound body 6601 includes a terminal 6602 and a terminal 6603, and is soaked in an electrolytic solution inside the battery can 6604. It is preferable that the terminal 6603 be in contact with the battery can 6604, and the terminal 6602 be insulated from the battery can 6604 with the use of an insulating member or the like. A metal material such as aluminum or a resin material can be used for the battery can 6604.

Figure 9A:
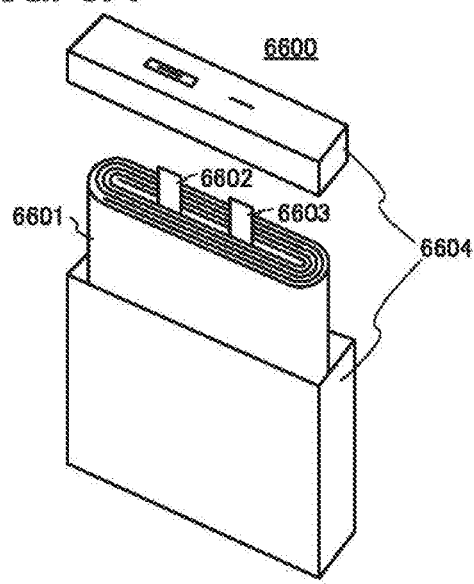
FIGS. 9A to 9D illustrate batteries.
Figure 9B:
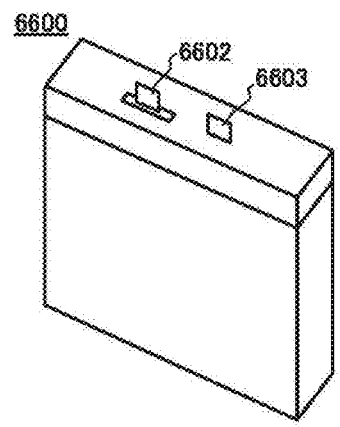
Figure 9C:
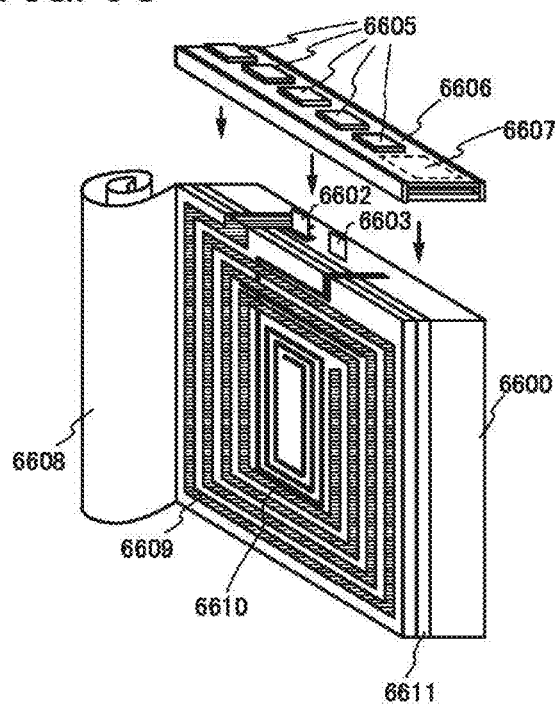
Figure 9D:
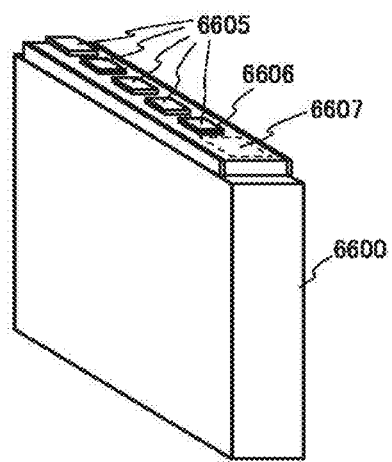

Further, as illustrated in FIG. 9B, the battery 6600 can be provided with an electric circuit and the like. FIGS. 9C and 9D illustrate an example of providing the battery 6600 with a circuit board 6606 in which an electric circuit and the like are provided, an antenna 6609, an antenna 6610, and a label 6608.

The circuit board 6606 includes an electric circuit 6607, terminals 6605, and the like. As the circuit board 6606, a printed circuit board (PCB) can be used, for example. When the printed circuit board is used as the circuit board 6606, electronic components such as a resistor, a capacitor, a coil (an inductor), and a semiconductor integrated circuit (IC) are mounted over the printed circuit board and connected, whereby the electric circuit 6607 can be formed. As well as the above-described electronic components, a variety of components, for example, a temperature sensing element such as a thermistor, a fuse, a filter, a crystal oscillator, and an electromagnetic compatibility (EMC) component can be mounted.

The electric circuit 6607 including these electronic components can function as a monitoring circuit for preventing overcharge or overdischarge of the battery 6600, a protection circuit against overcurrent, or the like.

The terminals 6605 included in the circuit board 6606 are connected to the terminal 6602, the terminal 6603, the antenna 6609, the antenna 6610, and the electric circuit 6607. Although the number of the terminals 6605 is five in FIGS. 9C and 9D, the number is not limited thereto, and may be a given number. With the use of the terminals 6605, the battery 6600 can be charged and discharged, and further, a signal can be sent and received to/from an electrical device including the battery 6600.

The antenna 6609 and the antenna 6610 can be used for transmitting and receiving electric power and a signal to/from the outside of the battery, for example. One or both of the antenna 6609 and the antenna 6610 are electrically connected to the electric circuit 6607 to allow the electric circuit 6607 to control the transmission and reception of electric power and a signal to/from the outside. Alternatively, one or both of the antenna 6609 and the antenna 6610 are electrically connected to the terminals 6605 to allow a control circuit of the electrical device including the battery 6600 to control the transmission and reception of electric power and a signal to/from the outside.

Note that although FIGS. 9C and 9D illustrate an example of the battery 6600 provided with two kinds of antenna, a variety of antennas may be provided or a structure where an antenna is not provided may be employed.

In FIGS. 9C and 9D, the antenna 6609 and the antenna 6610 each have a coil shape; however, without limitation thereon, a linear antenna or a flat plate antenna may be used, for example. Further, a planar antenna, an aperture antenna, a traveling-wave antenna, an EH antenna, a magnetic-field antenna, or a dielectric antenna may be used.

Note that an electromagnetic induction method, a magnetic resonance method, an electric wave method, or the like can be used for transmitting and receiving electric power wirelessly (also referred to as contactless power transmission, non-contact power transmission, wireless power supply, or the like).

The line width of the antenna 6609 is preferably larger than that of the antenna 6610. This makes it possible to increase the amount of electric power received by the antenna 6609.

In addition, a layer 6611 is provided between the antennas 6609 and 6610 and the battery 6600. The layer 6611 has a function of preventing shielding of an electric field or a magnetic field due to the wound body 6601, for example. In this case, a magnetic substance can be used for the layer 6611, for example. Alternatively, the layer 6611 may be a shielding layer.

Note that the antenna 6609 and the antenna 6610 can be used for a purpose which is different from the purpose of transmitting and receiving electric power or a signal to/from the outside. For example, when the electrical device including the battery 6600 does not include an antenna, the antenna 6609 and the antenna 6610 enable wireless communication with the electrical device.

This embodiment can be freely combined with any of the other embodiments. Specifically, in charging the battery obtained in this embodiment, products (e.g., lithium whiskers) are dissolved by supplying current (reverse pulse current) which flows in a direction opposite to a direction of current causing the products; thus, degradation of the battery is prevented or the battery can recover from the degradation, and charge and discharge performance of the battery is maximized and maintained for a long time. Further, supply of reverse pulse current to a battery during charge can eliminate defective batteries which are charged and discharged without any problem after manufacture and shipped as quality batteries but suddenly do not function as batteries for some reasons.

Embodiment 4

The driving method of a battery, which is one embodiment of the present invention, can be used for power sources included in a variety of electrical devices. Further, a maintenance-free battery can be obtained by supplying a reverse pulse current multiple times in charging a battery which is fabricated in one embodiment of the present invention.

Here, "electrical devices" refer to all general industrial products including portions which operate by electric power. Electrical devices are not limited to consumer products such as home electrical products and also include products for various uses such as business use, industrial use, and military use in their category. The following are examples of electrical devices capable of using the driving method of a battery, which is one embodiment of the present invention: display devices of televisions, monitors, and the like, lighting devices, desktop personal computers, notebook personal computers, word processors, image reproduction devices which reproduce still images or moving images stored in recording media such as digital versatile discs (DVDs), portable or stationary music reproduction devices such as compact disc (CD) players and digital audio players, portable or stationary radio receivers, recording reproduction devices such as tape recorders and IC recorders (voice recorders), headphone stereos, stereos, remote controls, clocks such as table clocks and wall clocks, cordless phone handsets, transceivers, mobile phones, car phones, portable or stationary game machines, pedometers, calculators, portable information terminals, electronic notebooks, e-book readers, electronic translators, audio input devices such as microphones, cameras such as still cameras and video cameras, toys, electric shavers, electric toothbrushes, high-frequency heating appliances such as microwave ovens, electric rice cookers, electric washing machines, electric vacuum cleaners, water heaters, electric fans, hair dryers, air-conditioning systems such as humidifiers, dehumidifiers, and air conditioners, dishwashers, dish dryers, clothes dryers, futon dryers, electric refrigerators, electric freezers, electric refrigerator-freezers, freezers for preserving DNA, flashlights, electric power tools, smoke detectors, and a health equipment and a medical equipment such as hearing aids, cardiac pacemakers, portable X-ray equipments, radiation counters, electric massagers, and dialyzers. The examples also include industrial equipment such as guide lights, traffic lights, meters such as gas meters and water meters, belt conveyors, elevators, escalators, automatic vending machines, automatic ticket machine, cash dispensers (CD), automated teller machines (ATM), digital signage, industrial robots, radio relay stations, mobile phone base stations, power storage systems, and batteries for leveling the amount of power supply and smart grid.

Note that in any of the electrical device, the driving method of a battery, which is one embodiment of the present invention, can be used for a main power source for supplying most of the power consumed by the electrical device. Alternatively, in any of the electrical device, the driving method of a battery, which is one embodiment of the present invention, can be used for an uninterruptible power source which can supply power to the electrical device when the supply of electric power from the main power source or a commercial power source is stopped. Further alternatively, the following driving method can be used for any of the electric device. In the driving method, reverse pulse current is supplied to a battery multiple times during charge of an auxiliary power source for supplying power to the electric device, while the electrical device is supplied with electric power from the main power source or the commercial power source. In the case where the driving method of a battery, which is one embodiment of the present invention, is used for an auxiliary power source, a maintenance-free electrical device can be obtained because a battery can recover from degradation, resulting in a reduction in cost and time which are required for the maintenance of a fixed power source or power storage equipment. Since the maintenance of the fixed power source or power storage equipment requires considerable cost, a great reduction in cost for the maintenance, which is a significant effect, can be achieved by the driving method of a battery obtained in this embodiment.

As another example of the electrical devices, a portable information terminal is described with reference to FIGS. 10A to 10C.

Figure 10A:
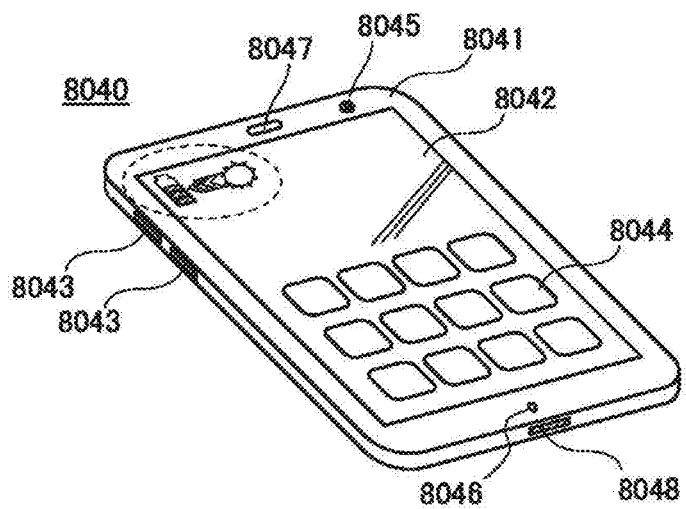
FIGS. 10A to 10C illustrate an electric device.

FIG. 10A is a perspective view illustrating a front surface and a side surface of a portable information terminal 8040. The portable information terminal 8040 is capable of executing a variety of applications such as mobile phone calls, e-mailing, viewing and editing texts, music reproduction, Internet communication, and a computer game. In the portable information terminal 8040, a housing 8041 includes a display portion 8042, a camera 8045, a microphone 8046, and a speaker 8047 on its front surface, a button 8043 for operation on its left side, and a connection terminal 8048 on its bottom surface.

A display module or a display panel is used for the display portion 8042. Examples of the display module or the display panel are a light-emitting device in which each pixel includes a light-emitting element typified by an organic light-emitting element (OLED); a liquid crystal display device; an electronic paper performing a display in an electrophoretic mode, an electronic liquid powder (registered trademark) mode, or the like; a digital micromirror device (DMD); a plasma display panel (PDP); a field emission display (FED); a plasma display panel (PDP); a surface conduction electron-emitter display (SED); a light-emitting diode (LED) display; a carbon nanotube display; a nanocrystal display; and a quantum dot display.

The portable information terminal 8040 illustrated in FIG. 10A is an example of providing the one display portion 8042 in the housing 8041; however, one embodiment of the present invention is not limited to this example. The display portion 8042 may be provided on a rear surface of the portable information terminal 8040. Further, the portable information terminal 8040 may be a foldable portable information terminal in which two or more display portions are provided.

A touch panel with which data can be input by an instruction means such as a finger or a stylus is provided as an input means on the display portion 8042. Therefore, icons 8044 displayed on the display portion 8042 can be easily operated by the instruction means. Since the touch panel is provided, a region for a keyboard on the portable information terminal 8040 is not needed and thus the display portion can be provided in a large region. Further, since data can be input with a finger or a stylus, a user-friendly interface can be obtained. Although the touch panel may be of any of a variety of types such as a resistive type, a capacitive type, an infrared ray type, an electromagnetic induction type, and a surface acoustic wave type, the resistive type or the capacitive type is particularly preferable because the display portion 8042 can be curved. Furthermore, such a touch panel may be what is called an in-cell touch panel, in which a touch panel is integral with the display module or the display panel.

The touch panel may also function as an image sensor. In this case, for example, an image of a palm print, a fingerprint, or the like is taken with the display portion 8042 touched with the palm or the finger, whereby personal authentication can be performed. Furthermore, with the use of backlight or a sensing light source emitting near-infrared light for the display portion 8042, an image of a finger vein, a palm vein, or the like can also be taken.

Further, instead of the touch panel, a keyboard may be provided in the display portion 8042. Furthermore, both the touch panel and the keyboard may be provided.

The button 8043 for operation can have a variety of functions in accordance with the intended use. For example, the button 8043 may be used as a home button so that a home screen is displayed on the display portion 8042 by pressing the button 8043. Further, the portable information terminal 8040 may be configured such that main power source thereof is turned off with a press of the button 8043 for a predetermined time. A structure may also be employed in which a press of the button 8043 brings the portable information terminal 8040 which is in a sleep mode out of the sleep mode. Besides, the button can be used as a switch for starting a variety of functions, depending on the length of time for pressing the button or by pressing the button and another button at the same time, for example.

Further, the button 8043 may be used as a volume control button or a mute button to have a function of adjusting the volume of the speaker 8047 for outputting sound, for example. The speaker 8047 outputs a variety of kinds of sound, examples of which are sound set for predetermined processing, such as startup sound of an operating system (OS), sound from sound files executed in various applications, such as music from music reproduction application software, and an incoming e-mail alert. Although not illustrated, a connector for outputting sound to a device such as headphones, earphones, or a headset may be provided together with or instead of the speaker 8047 for outputting sound.

As described above, the button 8043 can have a variety of functions. Although the number of the button 8043 is two in the portable information terminal 8040 in FIG. 10A, it is needless to say that the number, arrangement, position, or the like of the buttons 8043 is not limited to this example and can be designed as appropriate.

The microphone 8046 can be used for sound input and recording. Images obtained with the use of the camera 8045 can be displayed on the display portion 8042.

In addition to the operation with the touch panel provided on the display portion 8042 or the button 8043, the portable information terminal 8040 can be operated by recognition of user's movement (gesture) (also referred to as gesture input) using the camera 8045, a sensor provided in the portable information terminal 8040, or the like. Alternatively, with the use of the microphone 8046, the portable information terminal 8040 can be operated by recognition of user's voice (also referred to as voice input). By introducing a natural user interface (NUI) technique which enables data to be input to an electrical device by natural behavior of a human, the operational performance of the portable information terminal 8040 can be further improved.

The connection terminal 8048 is a terminal for inputting a signal at the time of communication with an external device or inputting electric power at the time of power supply. For example, the connection terminal 8048 can be used for connecting an external memory drive to the portable information terminal 8040. Examples of the external memory drive are storage medium drives such as an external hard disk drive (HDD), a flash memory drive, a digital versatile disk (DVD) drive, a DVD-recordable (DVD-R) drive, a DVD-rewritable (DVD-RW) drive, a compact disc (CD) drive, a compact disc recordable (CD-R) drive, a compact disc rewritable (CD-RW) drive, a magneto-optical (MO) disc drive, a floppy disk drive (FDD), and other nonvolatile solid state drive (SSD) devices. Although the portable information terminal 8040 has the touch panel on the display portion 8042, a keyboard may be provided on the housing 8041 instead of the touch panel or may be externally added.

Although the number of the connection terminal 8048 is one in the portable information terminal 8040 in FIG. 10A, it is needless to say that the number, arrangement, position, or the like of the connection terminals 8048 is not limited to this example and can be designed as appropriate.

Figure 10B:
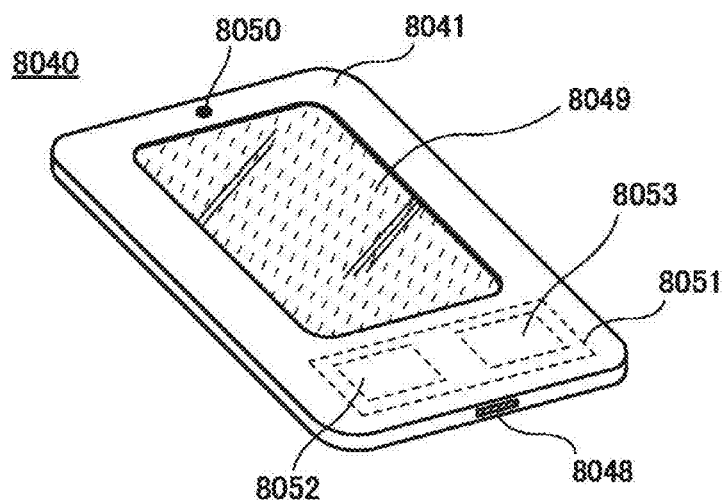

FIG. 10B is a perspective view illustrating the rear surface and the side surface of the portable information terminal 8040. In the portable information terminal 8040, the housing 8041 includes a solar cell 8049 and a camera 8050 on its rear surface; the portable information terminal 8040 further includes a charge and discharge control circuit 8051, a battery 8052, a DCDC converter 8053, and the like. FIG. 10B illustrates an example where the charge and discharge control circuit 8051 includes the battery 8052 and the DCDC converter 8053. The driving method of one embodiment of the present invention described above can be used for the battery 8052.

The solar cell 8049 attached on the rear surface of the portable information terminal 8040 can supply electric power to the display portion, the touch panel, a video signal processor, and the like. Note that the solar cell 8049 can be provided on one or both surfaces of the housing 8041. By including the solar cell 8049 in the portable information terminal 8040, the battery 8052 in the portable information terminal 8040 can be charged even in a place where an electric power supply unit is not provided, such as outdoors.

As the solar cell 8049, it is possible to use any of the following solar cells: a silicon-based solar cell including a single layer or a stacked layer of single crystal silicon, polycrystalline silicon, microcrystalline silicon, or amorphous silicon; an InGaAs-based, GaAs-based, CIS-based, $Cu_2ZnSnS_4$-based, or CdTe—CdS-based solar cell; a dye-sensitized solar cell including an organic dye; an organic thin film solar cell including a conductive polymer, fullerene, or the like; a quantum dot solar cell having a pin structure in which a quantum dot structure is formed in an i-layer with silicon or the like; and the like.

Here, an example of a structure and operation of the charge and discharge control circuit 8051 illustrated in FIG. 10B is described with reference to a block diagram in FIG. 10C.

Figure 10C:
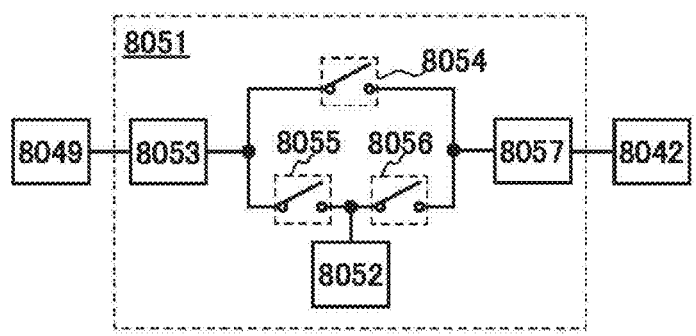

FIG. 10C illustrates the solar cell 8049, the battery 8052, the DCDC converter 8053, a converter 8057, a switch 8054, a switch 8055, a switch 8056, and the display portion 8042. The battery 8052, the DCDC converter 8053, the converter 8057, and the switches 8054 to 8056 correspond to the charge and discharge control circuit 8051 in FIG. 10B.

The voltage of electric power generated by the solar cell 8049 with the use of external light is raised or lowered by the DCDC converter 8053 to be at a level needed for charging the battery 8052. When electric power from the solar cell 8049 is used for the operation of the display portion 8042, the switch 8054 is turned on and the voltage of the electric power is raised or lowered by the converter 8057 to a voltage needed for operating the display portion 8042. In addition, when display on the display portion 8042 is not performed, the switch 8054 is turned off and the switch 8055 is turned on so that the battery 8052 may be charged.

Although the solar cell 8049 is described as an example of a power generation means, the power generation means is not particularly limited thereto, and the battery 8052 may be charged by another power generation means such as a piezoelectric element or a thermoelectric conversion element (Peltier element). The charging method of the battery 8052 in the portable information terminal 8040 is not limited thereto, and the connection terminal 8048 may be connected to a power source to perform charge, for example. The battery 8052 may be charged by a non-contact power transmission module performing charge by transmitting and receiving electric power wirelessly, or any of the above charging methods may be used in combination.

Here, the state of charge (SOC) of the battery 8052 is displayed on the upper left corner (in the dashed frame) of the display portion 8042. Thus, the user can check the state of charge of the battery 8052 and can accordingly select a power saving mode of the portable information terminal 8040. When the user selects the power saving mode, for example, the button 8043 or the icons 8044 can be operated to switch the components of the portable information terminal 8040, e.g., the display module or the display panel, an arithmetic unit such as CPU, and a memory, to the power saving mode. Specifically, in each of the components, the use frequency of a given function is decreased to stop the use. Further, the portable information terminal 8040 can be configured to be automatically switched to the power saving mode depending on the state of charge. Furthermore, by providing a sensor such as an optical sensor in the portable information terminal 8040, the amount of external light at the time of using the portable information terminal 8040 is sensed to optimize display luminance, which makes it possible to reduce the power consumption of the battery 8052.

In addition, when charging with the use of the solar cell 8049 or the like is performed, an image or the like showing that the charging is performed with the solar cell may be displayed on the upper left corner (in the dashed frame) of the display portion 8042 as illustrated in FIG. 10A.

Figure 11A:
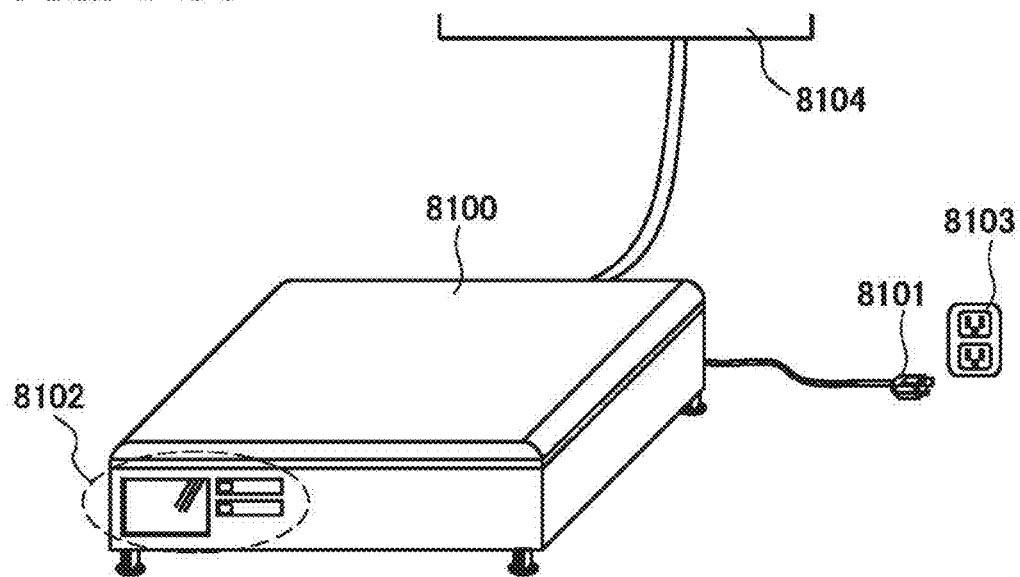
FIGS. 11A and 11B illustrate an electric device.
Figure 11B:
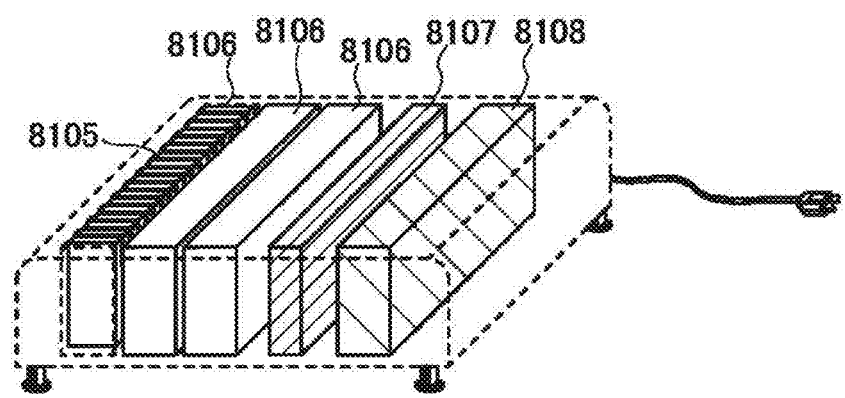

Moreover, a power storage system is described as another example of the electrical devices with reference to FIGS. 11A and 11B. A power storage system 8100 to be described here can be used at home. Here, the power storage system 8100 is described as a home-use power storage system as an example; however, it is not limited thereto and can also be used for business use or other uses.

As illustrated in FIG. 11A, the power storage system 8100 includes a plug 8101 for being electrically connected to a system power supply 8103. Further, the power storage system 8100 is electrically connected to a panelboard 8104 installed in home.

The power storage system 8100 may further include a display panel and the like 8102 for displaying an operation state or the like, for example. The display panel may have a touch screen. In addition, the power storage system 8100 may include a switch for turning on and off a main power source, a switch to operate the power storage system, and the like as well as the display panel.

Although not illustrated, an operation switch to operate the power storage system 8100 may be provided separately from the power storage system 8100; for example, the operation switch may be provided on a wall in a room. Alternatively, the power storage system 8100 may be connected to a personal computer, a server, or the like provided in home, in order to be operated indirectly. Still alternatively, the power storage system 8100 may be remotely operated using the Internet, an information terminal such as a smartphone, or the like. In such cases, a mechanism that performs wired or wireless communication between the power storage system 8100 and other devices is provided in the power storage system 8100.

FIG. 11B is a schematic view illustrating the inside of the power storage system 8100. The power storage system 8100 includes a plurality of battery groups 8106, a battery management unit (BMU) 8107, and a power conditioning system (PCS) 8108.

In the battery group 8106, a plurality of batteries 8105 are connected to each other. Electric power from the system power supply 8103 can be stored in the battery group 8106. The plurality of battery groups 8106 are each electrically connected to the BMU 8107.

The BMU 8107 has functions of monitoring and controlling states of the plurality of batteries 8105 in the battery group 8106 and protecting the batteries 8105. Specifically, the BMU 8107 collects data of cell voltages and cell temperatures of the plurality of batteries 8105 in the battery group 8106, monitors overcharge and overdischarge, monitors overcurrent, controls a cell balancer, manages the degradation condition of a battery, calculates the remaining battery level (the state of charge (SOC)), controls a cooling fan of a driving power storage device, or controls detection of failure, for example. Note that the batteries 8105 may have some of or all the functions, or the power storage device groups may have the functions. The BMU 8107 is electrically connected to the PCS 8108.

Overcharge means that charge is further performed in a state of full charge, and overdischarge means that discharge is further performed to the extent that the capacity is reduced so that operation becomes impossible. Overcharge can be prevented by monitoring the voltage of a battery during charge so that the voltage does not exceed a specified value (allowable value), for example. Overdischarge can be prevented by monitoring the voltage of a battery during discharge so that the voltage does not become lower than a specified value (allowable value). Overcurrent refers to a current exceeding a specified value (allowable value). Overcurrent of a battery is caused when a positive electrode and a negative electrode are short-circuited in the battery or the battery is under an extremely heavy load, for example. Overcurrent can be monitored by monitoring a current flowing through a battery.

The PCS 8108 is electrically connected to the system power supply 8103, which is an AC power source and performs DC-AC conversion. For example, the PCS 8108 includes an inverter, a system interconnection protective device that detects irregularity of the system power supply 8103 and terminates its operation, and the like. In charging the power storage system 8100, for example, AC power from the system power supply 8103 is converted into DC power and transmitted to the BMU 8107. In discharging the power storage system 8100, electric power stored in the battery group 8106 is converted into AC power and supplied to an indoor load, for example. Note that the electric power may be supplied from the power storage system 8100 to the load through the 8104 as illustrated in FIG. 11A or may be directly supplied from the power storage system 8100 through wired or wireless transmission.

Note that a power source for charging the power storage system 8100 is not limited to the system power supply 8103 described above; for example, electric power may be supplied from a solar power generating system installed outside.

This embodiment can be freely combined with any of the other embodiments.

This application is based on Japanese Patent Application serial no. 2013-023866 filed with Japan Patent Office on Feb. 8, 2013, the entire contents of which are hereby incorporated by reference.

What is claimed is:

1. A driving method of an electrochemical device comprising the step of:

after the electrochemical device comprising a battery is used and capacity of the battery is reduced by 10% or more from an initial value, supplying reverse pulse current to the battery multiple times during charge to make a capacity reduction less than 5% of the initial value, wherein a period during which the reverse pulse current flows is longer than or equal to 3 seconds and shorter than or equal to 30 seconds, wherein the battery comprises a positive electrode, a negative electrode, a separator, and an electrolyte solution, wherein the separator has a plurality of minute holes serving as paths through which lithium ions move between a pair of electrodes during charge and discharge, wherein a hole in the separator is clogged by lithium deposits after the electrochemical device comprising a battery is used and capacity of the battery is reduced by 10% or more from an initial value, and wherein the charge current is constant during two the reverse pulse currents.

2. The driving method of an electrochemical device, according to claim 1, wherein the battery contains lithium.

3. A driving method of an electrochemical device comprising the step of:

after the electrochemical device comprising a battery is used and capacity of the battery is reduced from an initial value because of rapid charge, supplying reverse pulse current to the battery multiple times during charge to make a capacity reduction less than 5% of the initial value, wherein a period during which the reverse pulse current flows is longer than or equal to 3 seconds and shorter than or equal to 30 seconds, and wherein the charge current is constant during two the reverse pulse currents.

4. The driving method of an electrochemical device, according to claim 3, wherein the battery comprises a positive electrode, a negative electrode, a separator, and an electrolyte solution.

5. The driving method of an electrochemical device, according to claim 3, wherein the battery contains lithium.

6. A driving method of an electrochemical device comprising the step of:

after the electrochemical device comprising a battery is used and capacity of the battery is reduced by 10% or more from an initial value, supplying current flowing in a direction opposite to a direction of current for charging to the battery multiple times in one charging period to make a capacity reduction less than 5% of the initial value, wherein lithium deposits occur during charge to the battery, wherein the occurred lithium deposits are dissolved by supplying current flowing in a direction opposite to a direction of current for charging to the battery, and wherein the charge current is constant during two the reverse pulse currents.

7. The driving method of an electrochemical device, according to claim 1, further comprising a switching period is from when the charge was stopped temporarily until when the supply of the reverse pulse current was started.

8. The driving method of an electrochemical device, according to claim 1, wherein the separator is polypropylene or polyethylene.

9. The driving method of an electrochemical device, according to claim 1, wherein the electrochemical device is a battery that can be charged.

10. A driving method of an electrochemical device comprising the step of:

after the electrochemical device comprising a battery is used and capacity of the battery is reduced from an initial value because charge and discharge are repeated 300 or more times, supplying reverse pulse current to the battery multiple times during charge to make a capacity reduction less than 5% of the initial value, wherein a period during which the reverse pulse current flows is longer than or equal to 3 seconds and shorter than or equal to 30 seconds, and wherein the charge current is constant during two the reverse pulse currents.

11. The driving method of an electrochemical device, according to claim 10, wherein the battery comprises a positive electrode, a negative electrode, a separator, and an electrolyte solution.

12. The driving method of an electrochemical device, according to claim 10, wherein the battery contains lithium.

13. The driving method of an electrochemical device, according to claim 6, wherein a period during supplying current flowing in a direction opposite is longer than or equal to 3 seconds and shorter than or equal to 30 seconds.

14. The driving method of an electrochemical device, according to claim 6, wherein the battery comprises a positive electrode, a negative electrode, a separator, and an electrolyte solution.

* * * * *